(12) United States Patent
Yang et al.

(10) Patent No.: US 8,849,690 B1
(45) Date of Patent: Sep. 30, 2014

(54) OPTIMIZED BILL OF WORK FOR AIRCRAFT MAINTENANCE BASED ON TASK PRIORITIZATION AND TIME SLOT PROXIMITY ANALYSIS

(75) Inventors: Su-Hsia Yang, Irving, TX (US); Pengcheng Zhang, Colleyville, TX (US); Mei Zhang, Lewisville, TX (US); Nancy Lee Lillo, Grapevine, TX (US); Arunprakash Dhanabal, Irving, TX (US); Tze-Yun Lin, Dallas, TX (US)

(73) Assignee: American Airlines, Inc., Fort Worth, TX (US)

( * ) Notice: Subject to any disclaimer, the term of this patent is extended or adjusted under 35 U.S.C. 154(b) by 546 days.

(21) Appl. No.: 12/822,859

(22) Filed: Jun. 24, 2010

Related U.S. Application Data

(60) Provisional application No. 61/220,005, filed on Jun. 24, 2009.

(51) Int. Cl.
*G06Q 10/00* (2012.01)
*G06Q 10/06* (2012.01)

(52) U.S. Cl.
CPC .. *G06Q 10/06312* (2013.01); *G06Q 10/063116* (2013.01)
USPC .......................... 705/7.22; 705/7.16; 705/7.17

(58) Field of Classification Search
CPC .............. G06Q 10/06312; G06Q 10/063116; G06Q 10/063118; G06F 17/00
USPC ........................ 705/7.22, 7.16, 7.17; 701/29.1
See application file for complete search history.

(56) References Cited

U.S. PATENT DOCUMENTS

| | | | | |
|---|---|---|---|---|
| 4,101,100 A * | 7/1978 | Smith et al. | ............... | 244/114 R |
| 4,819,183 A * | 4/1989 | O'Brien et al. | ............... | 700/282 |
| 4,843,575 A * | 6/1989 | Crane | ............... | 701/99 |
| 4,943,919 A * | 7/1990 | Aslin et al. | ........................ | 701/3 |
| 5,216,612 A * | 6/1993 | Cornett et al. | .................. | 700/96 |
| 5,318,254 A * | 6/1994 | Shaw et al. | ............... | 244/134 C |
| 5,369,570 A * | 11/1994 | Parad | ............................ | 705/7.13 |
| 5,490,646 A * | 2/1996 | Shaw et al. | ............... | 244/134 C |
| 5,931,878 A * | 8/1999 | Chapin, Jr. | .................. | 701/29.3 |
| 5,953,707 A * | 9/1999 | Huang et al. | ................. | 705/7.25 |
| 5,974,349 A * | 10/1999 | Levine | ............................ | 701/29 |
| 5,987,474 A * | 11/1999 | Sandifer | ............................ | 1/1 |
| 6,003,808 A * | 12/1999 | Nguyen et al. | ................ | 244/1 R |
| 6,006,171 A * | 12/1999 | Vines et al. | .................... | 702/184 |
| 6,014,633 A * | 1/2000 | DeBusk et al. | ............... | 705/7.12 |
| 6,067,486 A * | 5/2000 | Aragones et al. | ............ | 701/29.6 |
| 6,119,058 A * | 9/2000 | Anderberg | .................... | 701/34.3 |
| 6,125,312 A * | 9/2000 | Nguyen et al. | ............... | 701/29.4 |
| 6,292,806 B1 * | 9/2001 | Sandifer | ...................... | 705/26.1 |
| 6,408,258 B1 * | 6/2002 | Richer | ......................... | 702/182 |
| 6,418,361 B2 * | 7/2002 | Sinex | ........................... | 701/29.3 |

(Continued)

OTHER PUBLICATIONS

Boeing 777, Flight Manual, Continental, Sec. Intro TOC-1, No. 9, rev (selection) Nov. 1, 2002.*

(Continued)

*Primary Examiner* — Justin M Pats
*Assistant Examiner* — Octavian Rotaru
(74) *Attorney, Agent, or Firm* — Haynes and Boone, LLP

(57) ABSTRACT

A system and method for aircraft maintenance planning according to which an optimized bill of work is generated for a line maintenance station at which one or more airplanes are parked or are expected to be parked.

4 Claims, 22 Drawing Sheets

(56) References Cited

U.S. PATENT DOCUMENTS

| | | | | |
|---|---|---|---|---|
| 6,442,459 | B1* | 8/2002 | Sinex | 701/33.9 |
| 6,477,730 | B1* | 11/2002 | Marrero | 15/53.1 |
| 6,481,627 | B1* | 11/2002 | Guerreri | 235/472.01 |
| 6,505,106 | B1* | 1/2003 | Lawrence et al. | 701/29.3 |
| 6,554,183 | B1* | 4/2003 | Sticha et al. | 235/379 |
| 6,571,158 | B2* | 5/2003 | Sinex | 701/29.3 |
| 6,580,982 | B2* | 6/2003 | Sinex | 701/29.3 |
| 6,598,940 | B2* | 7/2003 | Sinex | 301/29 |
| 6,606,546 | B2* | 8/2003 | Sinex | 701/32.7 |
| 6,643,570 | B2* | 11/2003 | Bangert et al. | 701/32.1 |
| 6,671,593 | B2* | 12/2003 | Sinex | 701/29.4 |
| 6,684,136 | B2* | 1/2004 | Sinex | 701/29.4 |
| 6,691,006 | B2* | 2/2004 | Sinex | 701/29.4 |
| 6,728,610 | B1* | 4/2004 | Marshall et al. | 701/29.4 |
| 6,742,000 | B1* | 5/2004 | Fantasia et al. | 701/29.4 |
| 6,757,897 | B1* | 6/2004 | Shi et al. | 718/102 |
| 6,795,758 | B2* | 9/2004 | Sinex | 701/29.4 |
| 6,816,762 | B2* | 11/2004 | Hensey et al. | 701/32.6 |
| 6,820,038 | B1* | 11/2004 | Wetzer et al. | 702/184 |
| 6,845,306 | B2* | 1/2005 | Henry et al. | 701/29.6 |
| 6,853,954 | B2* | 2/2005 | Apostolides | 702/182 |
| 6,920,366 | B1* | 7/2005 | Luh et al. | 700/101 |
| 7,003,374 | B2* | 2/2006 | Olin et al. | 700/213 |
| 7,027,884 | B2* | 4/2006 | Watanabe et al. | 700/97 |
| 7,031,941 | B2* | 4/2006 | Garrow et al. | 705/50 |
| 7,069,121 | B1* | 6/2006 | Cummings et al. | 701/3 |
| 7,076,532 | B2* | 7/2006 | Craik | 709/217 |
| 7,082,383 | B2* | 7/2006 | Baust et al. | 702/184 |
| 7,117,162 | B1* | 10/2006 | Seal et al. | 705/7.15 |
| 7,124,059 | B2* | 10/2006 | Wetzer et al. | 702/184 |
| 7,330,819 | B2* | 2/2008 | Sinex | 705/4 |
| 7,376,600 | B1* | 5/2008 | Wadawadigi et al. | 705/28 |
| 7,440,906 | B1* | 10/2008 | Wetzer et al. | 705/7.12 |
| 7,457,762 | B2* | 11/2008 | Wetzer et al. | 705/7.25 |
| 7,457,763 | B1* | 11/2008 | Garrow et al. | 705/7.24 |
| 7,502,744 | B2* | 3/2009 | Garrow et al. | 705/1.1 |
| 7,519,444 | B2* | 4/2009 | Lilly et al. | 700/100 |
| 7,548,802 | B2* | 6/2009 | Avery et al. | 701/29.3 |
| 7,551,086 | B2* | 6/2009 | Coop et al. | 340/572.1 |
| 7,689,329 | B2* | 3/2010 | Avery et al. | 701/14 |
| 7,693,621 | B1* | 4/2010 | Chamas | 701/16 |
| 7,761,200 | B2* | 7/2010 | Avery et al. | 701/29.3 |
| 7,761,201 | B2* | 7/2010 | Avery et al. | 701/29.3 |
| 7,761,879 | B1* | 7/2010 | Winston et al. | 719/314 |
| 7,778,891 | B1* | 8/2010 | Zhang et al. | 705/28 |
| 7,904,192 | B2* | 3/2011 | Chua et al. | 700/100 |
| 7,908,052 | B2* | 3/2011 | Howlett et al. | 701/32.8 |
| 7,937,280 | B1* | 5/2011 | Leung et al. | 705/6 |
| 8,036,955 | B2* | 10/2011 | Avery et al. | 705/28 |
| 8,170,900 | B2* | 5/2012 | Young et al. | 705/7.25 |
| 8,195,535 | B2* | 6/2012 | Nagalla et al. | 705/29 |
| 8,266,066 | B1* | 9/2012 | Wezter et al. | 705/78 |
| 8,340,854 | B2* | 12/2012 | Doulatshahi et al. | 701/29.1 |
| 8,356,244 | B2* | 1/2013 | Vandermolen et al. | 715/230 |
| 8,396,571 | B2* | 3/2013 | Costiner et al. | 700/28 |
| 8,423,430 | B2* | 4/2013 | Avery et al. | 705/28 |
| 8,478,477 | B2* | 7/2013 | Maisonneuve et al. | 701/29.4 |
| 8,504,396 | B2* | 8/2013 | Quintus et al. | 705/7.11 |
| 8,645,148 | B2* | 2/2014 | Small et al. | 705/1.1 |
| 8,655,698 | B2* | 2/2014 | West et al. | 705/7.12 |
| 2001/0037229 | A1* | 11/2001 | Jacobs et al. | 705/8 |
| 2002/0035495 | A1* | 3/2002 | Spira et al. | 705/7 |
| 2002/0065749 | A1* | 5/2002 | Ikeda et al. | 705/28 |
| 2002/0069001 | A1* | 6/2002 | Sinex | 701/29 |
| 2002/0121288 | A1* | 9/2002 | Marrero | 134/6 |
| 2002/0133389 | A1* | 9/2002 | Sinex | 705/9 |
| 2002/0143601 | A1* | 10/2002 | Sinex | 705/9 |
| 2003/0040826 | A1* | 2/2003 | Hawman et al. | 700/116 |
| 2003/0101578 | A1* | 6/2003 | Moriya et al. | 29/771 |
| 2003/0109973 | A1* | 6/2003 | Hensey et al. | 701/35 |
| 2003/0149548 | A1* | 8/2003 | Mosses et al. | 702/184 |
| 2003/0167110 | A1* | 9/2003 | Smith et al. | 701/3 |
| 2003/0208392 | A1* | 11/2003 | Shekar et al. | 705/8 |
| 2004/0122722 | A1* | 6/2004 | Quintus et al. | 705/8 |
| 2004/0122723 | A1* | 6/2004 | Quintus et al. | 705/8 |
| 2004/0138938 | A1* | 7/2004 | Quintus et al. | 705/8 |
| 2005/0090969 | A1* | 4/2005 | Siok et al. | 701/120 |
| 2005/0125274 | A1* | 6/2005 | Nastacio et al. | 705/8 |
| 2005/0187739 | A1* | 8/2005 | Baust et al. | 702/184 |
| 2005/0198803 | A1* | 9/2005 | Moriya et al. | 29/430 |
| 2005/0216139 | A1* | 9/2005 | Laughlin et al. | 701/3 |
| 2005/0246224 | A1* | 11/2005 | McKanna et al. | 705/13 |
| 2005/0246275 | A1* | 11/2005 | Nelson | 705/40 |
| 2005/0267673 | A1* | 12/2005 | Blagg et al. | 701/123 |
| 2005/0288983 | A1* | 12/2005 | Biegler et al. | 705/8 |
| 2006/0046718 | A1* | 3/2006 | Gevalt | 455/432.3 |
| 2006/0089846 | A1* | 4/2006 | Middlebrook | 705/1 |
| 2006/0143063 | A1* | 6/2006 | Braun et al. | 705/8 |
| 2006/0186260 | A1* | 8/2006 | Magnuson et al. | 244/1 R |
| 2006/0294140 | A1* | 12/2006 | Schemionek et al. | 707/104.1 |
| 2007/0112488 | A1* | 5/2007 | Avery et al. | 701/35 |
| 2007/0112489 | A1* | 5/2007 | Avery et al. | 701/35 |
| 2007/0150329 | A1* | 6/2007 | Brook et al. | 705/8 |
| 2007/0156496 | A1* | 7/2007 | Avery et al. | 705/8 |
| 2007/0219944 | A1* | 9/2007 | Liu et al. | 707/2 |
| 2007/0265896 | A1* | 11/2007 | Smith | 705/7 |
| 2008/0103843 | A1* | 5/2008 | Goeppert et al. | 705/7 |
| 2008/0159158 | A1* | 7/2008 | Poisson et al. | 370/249 |
| 2008/0243570 | A1* | 10/2008 | Moorkanat et al. | 705/7 |
| 2008/0270150 | A1* | 10/2008 | Verol | 705/1 |
| 2009/0105866 | A1* | 4/2009 | Fontanot | 700/112 |
| 2009/0125357 | A1* | 5/2009 | Vannette et al. | 705/8 |
| 2009/0132111 | A1* | 5/2009 | Macchia et al. | 701/33 |
| 2009/0132321 | A1* | 5/2009 | Kamisuwa et al. | 705/8 |
| 2009/0138423 | A1* | 5/2009 | Nwadiogbu et al. | 706/46 |
| 2009/0138873 | A1* | 5/2009 | Beck et al. | 717/173 |
| 2009/0150022 | A1* | 6/2009 | McMillin et al. | 701/35 |
| 2009/0164490 | A1* | 6/2009 | Wininger et al. | 707/100 |
| 2009/0187449 | A1* | 7/2009 | Van Tulder et al. | 705/8 |
| 2009/0192659 | A1* | 7/2009 | Beebe et al. | 701/2 |
| 2009/0243854 | A1* | 10/2009 | Scheid et al. | 340/572.1 |
| 2009/0254403 | A1* | 10/2009 | Nagalla et al. | 705/9 |
| 2009/0312897 | A1* | 12/2009 | Jamrosz et al. | 701/29 |
| 2010/0010708 | A1* | 1/2010 | Bailly et al. | 701/35 |
| 2010/0017241 | A1* | 1/2010 | Lienhardt | 705/8 |
| 2010/0042445 | A1* | 2/2010 | Nicosia | 705/7 |
| 2010/0100271 | A1* | 4/2010 | Nagalla et al. | 701/29 |
| 2010/0131149 | A1* | 5/2010 | Saugnac et al. | 701/33 |
| 2011/0202924 | A1* | 8/2011 | Banguero et al. | 718/103 |

OTHER PUBLICATIONS

IT strategies for aircraft configuration management, Aircraft Commerce, Issue No. 39, Feb.-Mar. 2005.*
Marmel et all, Microsoft Office Project 2007, all-in-one desk reference for dummies, Wiley publiching, ISBM 978-0-470-13767-3, (selection) 2007.*
NASA Systems Engineering Handbook, NASA SP 6105, rev 1, (selection) 2007.*
NASA, Systems Engineering handbook, PPMI publishing, SP-610S, Jun. 1995.*
Oracle Complex Maintainance, Repair and Overhaul Implementation Guide, release 11i, part No. B13737-04, Oracle, Jul. 2005.*
Ramohalli Gautham, The Honeywell On-board diagnostic and maintenance system for the Boeing 777, IEEE, 0-7803-0820-4, 1992.*
Sinex, specification of U.S. Appl. No. 60/168,400 leading to application 09727671, Dec. 1999.*
Zhang et al, Reducing maintenance cost through effective prediction analysis and process integration Journal Advances in Vibration Engineering 5-2, p. 87-96, 2006.*
Marmel Elaine, Microsoft Project 2007 Bible, Wiley Publishing, ISBN, 0-470-00992-6, (selection) 2007.*
Alvarez-Valdes et al, Labour Scheduling at an Airport Refuelling Installation, J of Operation Research Society, V50, N3, pp. 211-218, Mar. 1999 http://www.jstor.org/stable/3010684.*
Goplan et al, The Aircraft maintenance routing problem, Operations Research, 46, 2, p. 260, Apr. 1998.*
Hesham Alfares K, Aircraft maintenance workforce scheduling, Journal of Quality Maintenance Eng, V5, N2, pp. 78-88, 1999 http://www.ccse.kfupm.edu.sa/~hesham/JP6_Aircraft_Maintenance.pdf.*

(56) References Cited

OTHER PUBLICATIONS

Polimac et al, Maintenance Scheduling according to reliability targets and actual equipment performance, CIRED, IEE Jun. 18-21, 2001 http://ieeexplore.ieee.org/stamp/stamp.jsp?arnumber=00942940.*

Roach et al, A Hybrid GA-SA Algorithm for Just-In-Time scheduling of multi-level assemblies, Computers ind Eng, N4, pp. 1047-1060, Elsevier S0360835296, 1996.*

Shehory et al, Agent aided aircraft maintenance, Autonomous Agents 99, ACM 1-58113-066-x-99-05, 1999 http://dl.acm.org/citation.cfm?id=301216.*

Sprinkle et al, Analysis and Representation of Clauses in Satisfiability of Constraints, ISIS-01-205, Vanderbuilt University, 2001 http://w3.isis.vanderbilt.edu/Projects/micants/Tech/index.html.*

Swanson Laura, Linking maintenance strategies to performance, Int J Production Economics 70, 237-244, Elsevier 2001 http://www.sciencedirect.com/science/article/pii/S0925527300000670#.* vanBuskirk et al, Computer-aided Aircraft Maintenance Scheduling, ISIS-02-03, Vanderbuilt University 2002 http://w3.isis.vanderbilt.edu/Projects/micants/Tech/TR-02-303.doc.*

Sriram et al, An optimization model for aircraft maintenance scheduling and re-assignment, Transportation Research A 37, 29-48, Elsevier, 2003 http://www.sciencedirect.com/science/article/pii/S0965856402000046#.*

* cited by examiner

| Maintenance Item | Priority Ranking | Critical? | Total Number of Manhours Required to Complete Maintenance Item | Total Number of Aircraft Maintenance Technicians (AMTs) Required to Complete Maintenance Item |
|---|---|---|---|---|
| T32 | 100 | Yes | 2 | 2 |
| T12 | 90 | Yes | 1 | 1 |
| T11 | 90 | Yes | 3 | 2 |
| T22 | 85 | Yes | 4 | 2 |
| T31 | 85 | Yes | 3 | 1 |
| T21 | 81 | Yes | 3 | 2 |
| T23 | 75 | No | 2 | 1 |
| T33 | 72 | No | 1 | 1 |
| T13 | 70 | No | 1 | 2 |
| . | . | . | . | . |
| . | . | . | . | . |
| . | . | . | . | . |

FIG. 5

| Maintenance Item | Priority Ranking | Critical? | Total Number of Manhours Required to Complete Maintenance Item | Total Number of Aircraft Maintenance Technicians (AMTs) Required to Complete Maintenance Item |
|---|---|---|---|---|
| Highest Priority: Tail T2 (Airplane 14b) | | | | |
| T22 | 85 | Yes | 4 | 2 |
| T21 | 81 | Yes | 3 | 2 |
| T23 | 75 | No | 2 | 1 |
| Second Highest Priority: Tail T3 (Airplane 14c) | | | | |
| T32 | 100 | Yes | 2 | 2 |
| T31 | 85 | Yes | 3 | 1 |
| T33 | 72 | No | 1 | 1 |
| Third Highest Priority: Tail T1 (Airplane 14a) | | | | |
| T11 | 90 | Yes | 3 | 2 |
| T13 | 70 | No | 1 | 2 |
| T12 | 90 | Yes | 1 | 1 |
| . | . | . | . | . |
| . | . | . | . | . |

FIG. 7

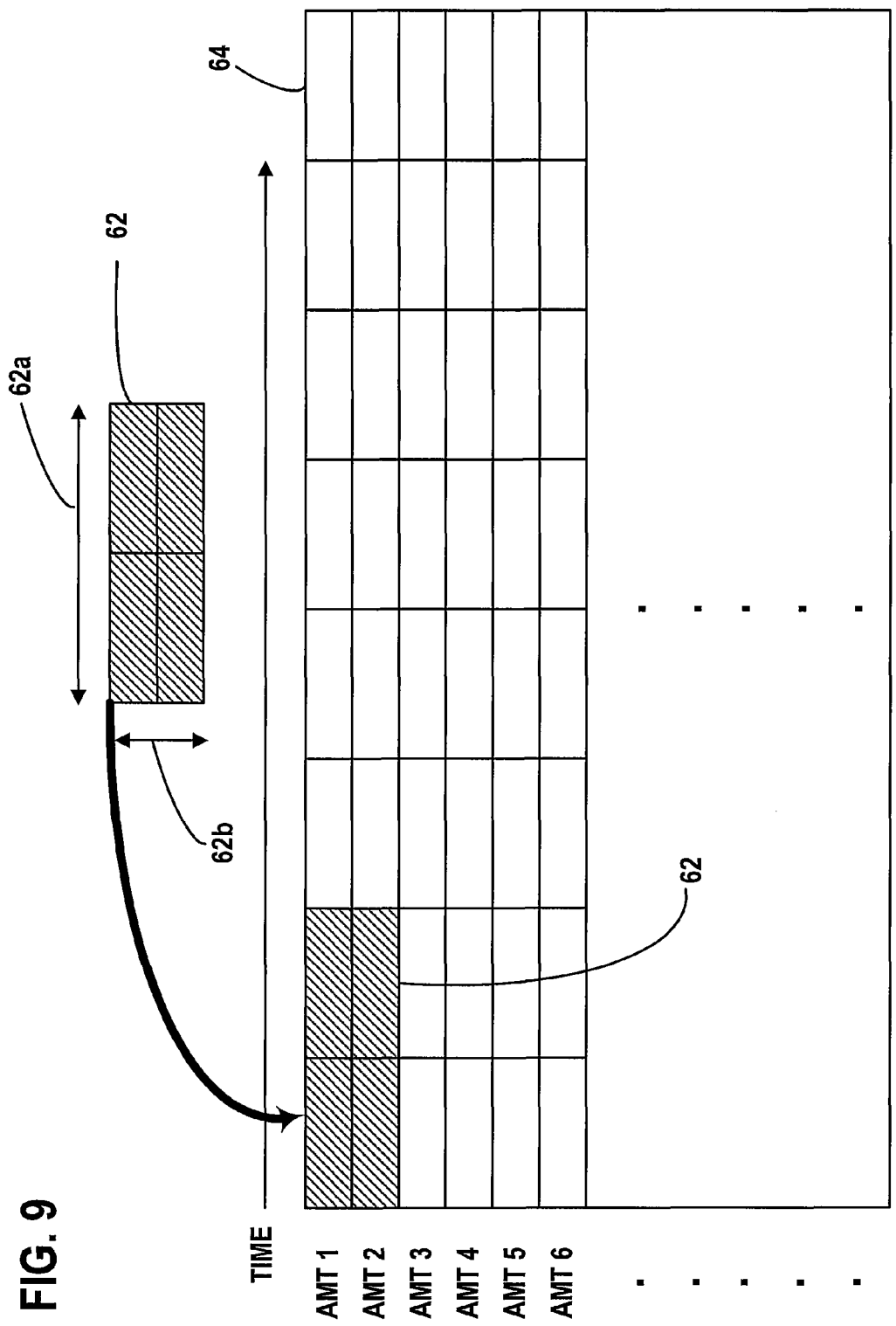

| | 10PM | 11PM | 12AM | 1AM |
|---|---|---|---|---|
| AMT 12: | 7AP_SC (22:00-2 | 7AP_785CCF (22:30-02:00) | | 64 |
| AMT 13: | 7AP_SC (22:00-2 | 7AP_785CCF (22:30-02:00) | | |
| AMT 14: | 4WX_PS (22:00-23:15) | 4WX (23: | 4WX_25E0DF (23:30-01:30) | 4WX_25E0E9 (01:30-02:30) |
| AMT 15: | 4WX_PS (22:00-23:15) | 4WX (23: | 4WX_25E0E3 (23:30-01:30) | 4WX_33E0ED (01:30-02:30) |
| AMT 19: | 7AM_ACK (22:00-02:10) | | | |
| AMT 20: | 279_AC (22:00-23:30) | | 5EA_SC (00:00-00:45) | 5EA_254404 (00:45-01:45) |
| AMT 22: | 279_AC (22:00-23:30) | | 5EA_SC (00:00-00:45) | 5EA_254 (00:45-0 |
| AMT 23: | 7AM_ACK (22:00)-02:10) | | | |
| AMT 25: | 7AM_ACK (22:00)-02:10) | | | |
| AMT 26: | 7AP_715E6D (22:00-00:00) | | 7AP_255DCC (00:00-01:00) | 7AP_335E19 (01:00-02:00) |
| AMT 27: | 279_AC (22:00-23:30) | | 452_SC (00:00-00:45) | 452_30E8B4 (00:45-02:15) |
| AMT 29: | | | 452_SC (00:00-00:45) | 452_30E8B4 (00:45-02:15) |
| AMT 66: | 449_30EDC7 (22:00-01:00) | | | 7AM_ACK (01:30-02:30) |
| AMT 68: | 449_30EDC7 (22:00-01:00) | | | 7AM_ACK (01:30-02:30) |

*FIG. 15A*

| 2AM | 3AM | | | 4AM | | 5AM | 6AM |
|---|---|---|---|---|---|---|---|
| 7AP_785CD0 (02:00-05:30) | | | | | | | |
| 7AP_785CD0 (02:00-05:30) | | | | | | | 7AP 4922 (05:30-06:15) |
| | | | | | | | 7AP 4922 (05:30-06:15) |
| | 4WX 25E0E8 (02:30-03:30) | | | | | | |
| | | 425 SC (03:00-03:45) | | 425 33EDBB (03:45-04:45) | | | |
| 7AM 4921 (02:10-02:55) | | | 246 PS (03:25-04:40) | | | | |
| 233 SC (02:15-03:00) | | | | 558 SC (03:30-04:15) | | | |
| 233 SC (02:15-03:00) | | | | 558 SC (03:30-04:15) | | | |
| 7AM 4921 (02:10-02:55) | | | 246 PS (03:25-04:40) | | | | |
| | | 425 SC (03:00-03:45) | | 425 33EDBD (03:45-04:45) | | | |
| 7AP 255E4A (02:00-03:00) | 7AP 255E4E (03:00-04:00) | | | 7AP 715E6A (04:00-05:00) | | | |
| 452 33E8B1 (02:15-03:15) | | | 449 PS (03:45-05:00) | | | 449 25ED6F (05:00-06:00) | |
| 452 25E8AF (02:15-03:15) | | | 449 PS (03:45-05:00) | | | 449 25EDCE (05:00-06:00) | |
| | 279 591 (03:00-0 | | | 4WX 21E0EC (04:00-05:00) | | | |
| | 279 591 (03:00-0 | | | | | | |

OPTIMIZED BILL OF WORK FOR AIRCRAFT MAINTENANCE BASED ON TASK PRIORITIZATION AND TIME SLOT PROXIMITY ANALYSIS

CROSS-REFERENCE TO RELATED APPLICATION

This application claims the benefit of the filing date of U.S. patent application No. 61/220,005, filed Jun. 24, 2009, the entire disclosure of which is incorporated herein by reference.

BACKGROUND

The present disclosure relates in general to a system and method for maintenance planning, and in particular to a system and method for aircraft maintenance planning.

BRIEF DESCRIPTION OF THE DRAWINGS

FIG. 5 is a tabular illustration of output generated during the step of FIG. 4, according to an exemplary embodiment.

FIG. 7 is a tabular illustration of output generated during the step of FIG. 6, according to an exemplary embodiment.

FIG. 9 is a diagrammatic illustration of a step of the step of FIGS. 8A, 8B and 8C, according to an exemplary embodiment.

FIG. 15 is a diagrammatic illustration of a portion of output generated during the method of FIG. 3, according to an exemplary embodiment.

DETAILED DESCRIPTION

Figure 1A:
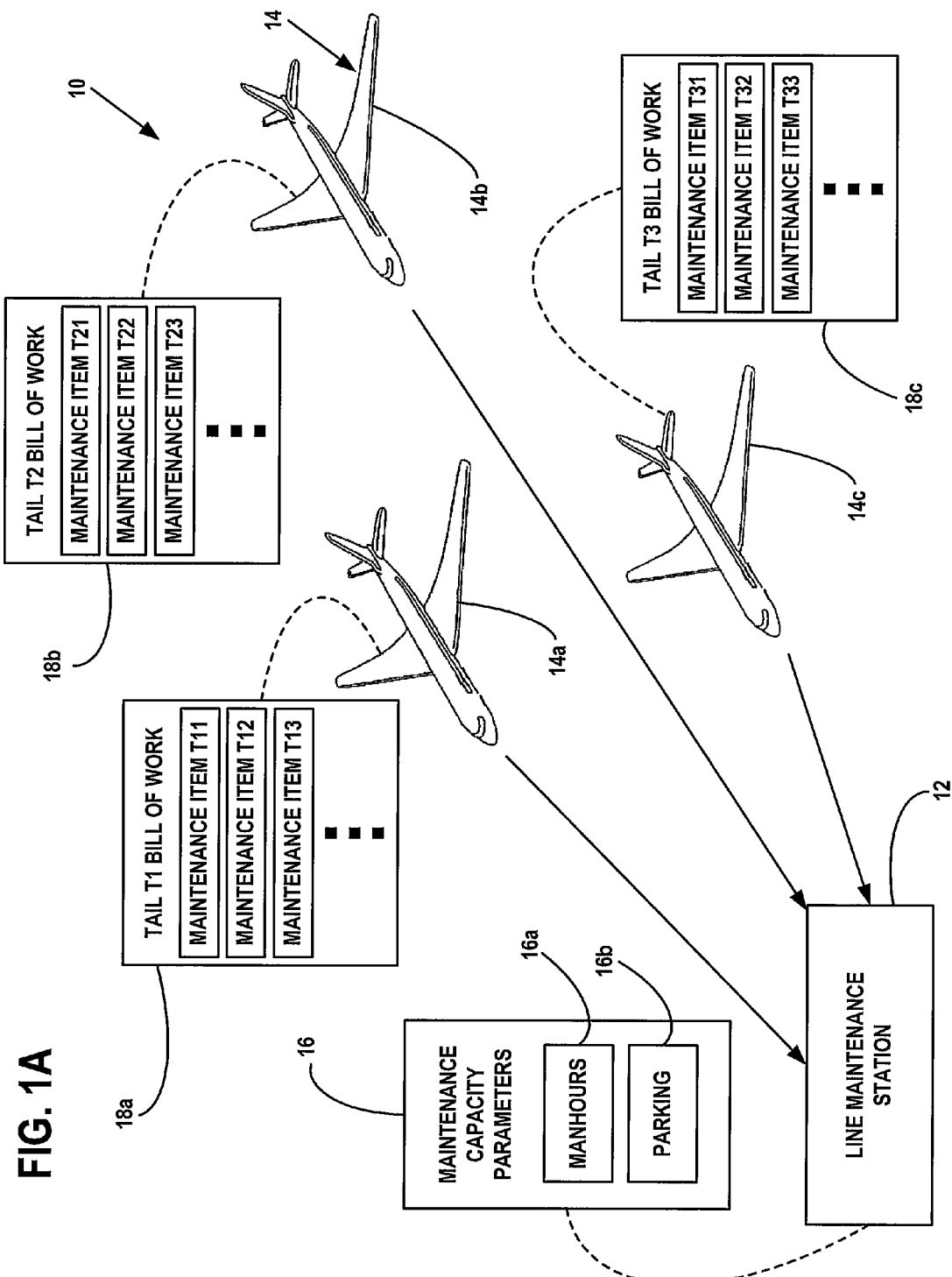
FIGS. 1A and 1B are diagrammatic illustrations of a system according to an exemplary embodiment, the system including a user device located at a maintenance operations center.
Figure 1B:
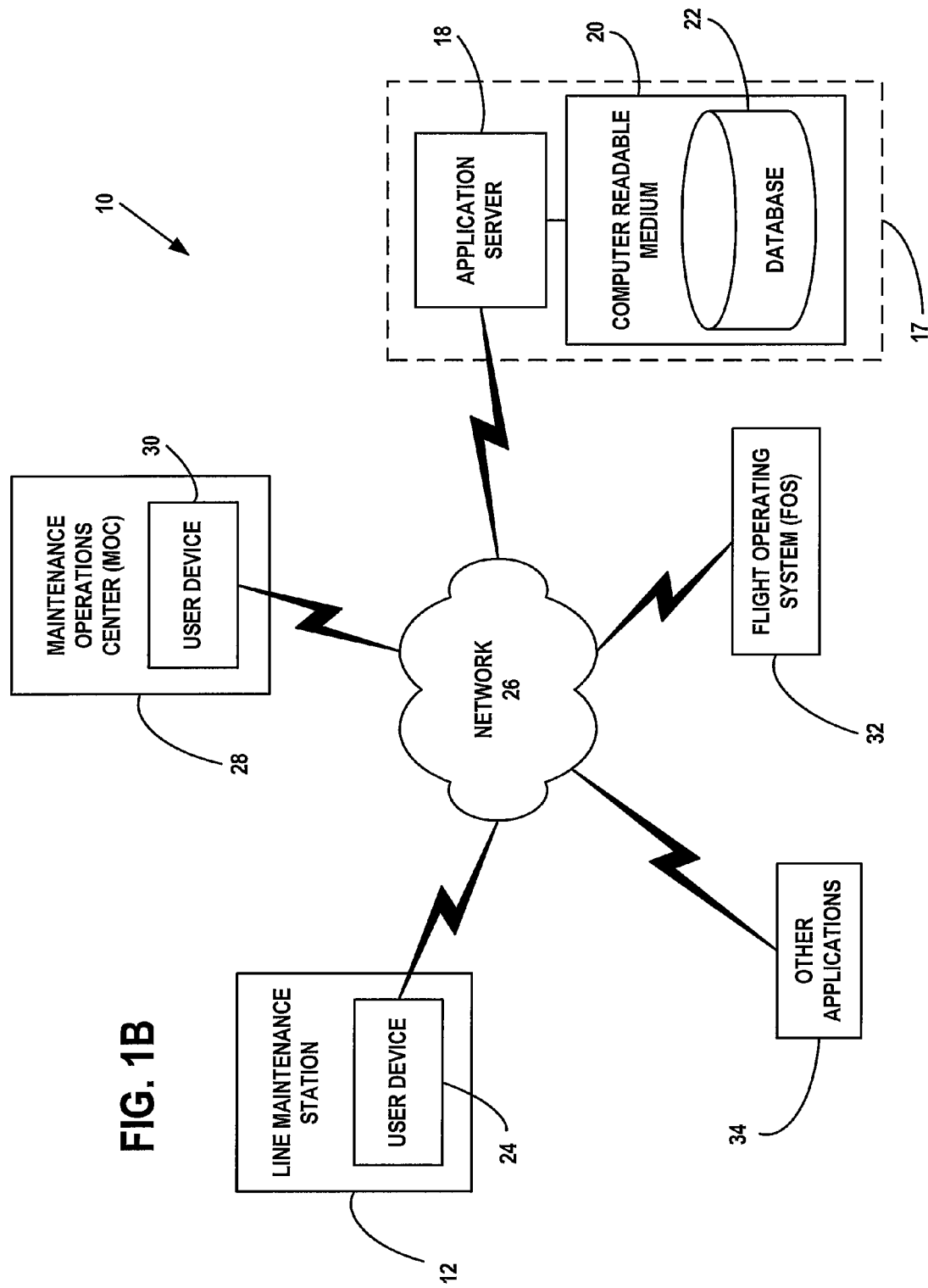

In an exemplary embodiment, as illustrated in FIGS. 1A and 1B, a system is generally referred to by the reference numeral 10 and includes a line maintenance station 12 at which a plurality of airplanes 14 are planned or otherwise expected to terminate, that is, are expected to be parked for a time period t (not shown), such as overnight, for the purpose of maintenance on the airplanes. The plurality of airplanes 14 includes airplanes 14a, 14b and 14c. In several exemplary embodiments, the line maintenance station 12 is or includes one or more airport terminals, airline gates, hangars, other maintenance facilities or areas, terminal bays, terminal ramps, hangar bays, hangar ramps, and/or any combination thereof. The line maintenance station 12 has maintenance capacity parameters 16, which include a manhours parameter 16a and a parking parameter 16b. In an exemplary embodiment, the manhours parameter 16a is the amount of manhours available at the line maintenance station 12 over the time period t during which the airplanes 14a, 14b and 14c are expected to be parked at the line maintenance station 12 for maintenance. That is, the amount of hours of work that the line maintenance station 12 has available to accomplish the work. In an exemplary embodiment, the manhours parameter 16a is equal to the number of aircraft maintenance technicians (AMTs) expected to be working at the line maintenance station 12 during the period of time t multiplied by the number of hours that each AMT is expected to work at the line maintenance station 12 during the time period t. In an exemplary embodiment, the parking parameter 16b is the amount of space available for parking airplanes expected to be serviced or otherwise worked on at the line maintenance station 12 during the time period t, including the airplanes 14a, 14b, 14c. In an exemplary embodiment, the time period t is the work shift time period over which a set of AMTs is expected to work on the airplanes 14a, 14b and 14c.

As shown in FIG. 1A, the airplanes 14a, 14b and 14c are assigned tail numbers T1, T2 and T3, respectively, and include bills of work 18a, 18b and 18c, respectively. Each of the bills of work 18a, 18b and 18c includes one or more maintenance items, that is, maintenance work or jobs or tasks that need to be, or are least desired to be, performed on the corresponding airplane 14a, 14b or 14c. For example, the bill of work 18a includes three maintenance jobs that are desired to be performed on the airplane 14a and that are identified as maintenance items T11, T12 and T13, with the prefix T1 identifying the tail number of the airplane 14a. The bill of work 18b includes three maintenance jobs that are desired to be performed on the airplane 14b and that are identified as maintenance items T21, T22 and T23, with the prefix T2 identifying the tail number of the airplane 18b. The bill of work 18c includes three maintenance jobs that are desired to be performed on the airplane 14c and that are identified as maintenance items T31, T32 and T33, with the prefix T3 identifying the tail number of the airplane 18c. Each of the maintenance items T11-T33 has an attribute associated with one of a plurality of categories of maintenance items, the plurality including a category for critical maintenance items that must be completed and at least one category for non-critical maintenance items.

As shown in FIG. 1B, the system 10 further includes a module 17, which includes an application server 18 and a computer readable medium 20 operably coupled thereto. Instructions accessible to, and executable by, the server 18 are stored in the computer readable medium 20. A database 22 is also stored in the computer readable medium 20. The line maintenance station 12 includes a user device 24, which is operably coupled to, and in two-way communication with, the application server 18 via a network 26. A maintenance operations center (MOC) 28 includes a user device 30, which is operably coupled to, and in two-way communication with, the application server 18 via the network 26. In an exemplary embodiment, the MOC 28 is remotely located from the line maintenance station 12. A flight operating system (FOS) 32 is operably coupled to, and in two-way communication with, the application server 18 via the network 26. One or more other applications 34 are operably coupled to, and in two-way communication with, the application server 18 via the network 26. In several exemplary embodiments, the applications 34 include one or more of the following: a system time control (STC), a maintenance operations control advisor, a field maintenance workload control system, a work card management system, a field maintenance reliability system, and a purchasing and inventory control system.

In an exemplary embodiment, the server 18 is a web application server. In an exemplary embodiment, the module 17 is, includes, or is at least a part of, a web-based program, an Intranet-based program, and/or any combination thereof. In an exemplary embodiment, the module 17 and/or one or more components thereof, the computer readable medium 20 and/or content stored therein, the database 22 and/or content stored therein, and/or any combination thereof, are part of, and/or are distributed throughout, the system 10 and/or one or more of the components thereof, including, for example, one or more of the user devices 24 and 30. In an exemplary embodiment, the network 26 includes the Internet, one or more local area networks, one or more wide area networks, one or more cellular networks, one or more wireless networks, one or more voice networks, one or more data networks, one or more communication systems, and/or any combination thereof. In several exemplary embodiments, the respective quantities of one or more of the components and/or parts of the system 10, such as, for example, the respective quantities of the module 17, the server 18, the computer readable medium 20, the database 22, the user device 24 and the user device 30, are increased, decreased or otherwise varied.

Figure 2:
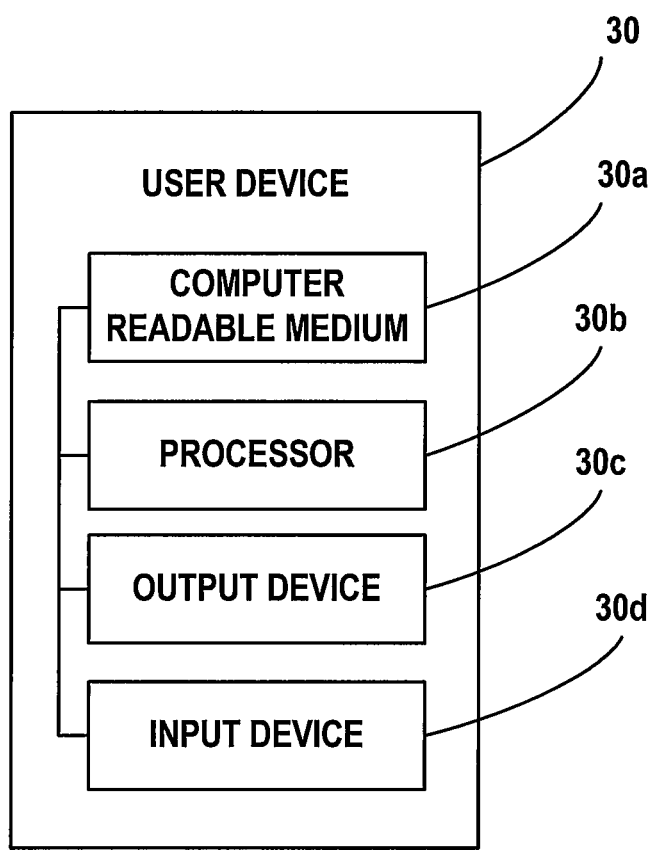
FIG. 2 is a diagrammatic illustration of the user device of FIG. 1, according to an exemplary embodiment.

In an exemplary embodiment, as illustrated in FIG. 2 with continuing reference to FIGS. 1A and 1B, the user device 30 includes a computer readable medium 30*a*, a processor 30*b*, an output device 30*c*, and an input device 30*d*. In an exemplary embodiment, instructions accessible to, and executable by, the processor 30*b* are stored in the computer readable medium 30*a*. In an exemplary embodiment, spreadsheet, web browser and/or application software is stored in the computer readable medium 30*a*. In an exemplary embodiment, the output device 30*c* includes a graphical display, which, in several exemplary embodiments, is in the form of, or includes, one or more digital displays, one or more liquid crystal displays, one or more cathode ray tube monitors, and/or any combination thereof. In an exemplary embodiment, the output device 30*c* includes a graphical display, a printer, a plotter, and/or any combination thereof. In an exemplary embodiment, the input device 30*d* includes a touch screen, which, in several exemplary embodiments, is, includes, or is at least a part of, the output device 30*c*. In an exemplary embodiment, instead of, or in addition to a touch screen, the input device 30*d* includes one or more keyboards, one or more PIN pads, one or more scanners, one or more card readers, and/or any combination thereof.

In an exemplary embodiment, the user device 30 is, includes, or is at least a part of, the module 17, the server 18, the computer readable medium 20, the database 22, and/or any combination thereof. In several exemplary embodiments, the user device 30 is a thin client and the server 18 controls at least a portion of the operation of the user device 30. In several exemplary embodiments, the user device 30 is a thick client. In several exemplary embodiments, the user device 30 functions as both a thin client and a thick client. In several exemplary embodiments, the user device 30 is, or includes, a telephone, a personal computer, a portable computer, a personal digital assistant, a cellular telephone, a smart phone, other types of telecommunications devices, other types of computing devices, and/or any combination thereof. In several exemplary embodiments, the user device 30 is, or at least includes, the module 17.

In an exemplary embodiment, the user device 24 is substantially identical to the user device 30. Reference numerals used to refer to the components of the user device 24 that are substantially identical to the components of the user device 30 will correspond to the reference numerals used to refer to the components of the user device 30, except that the prefix for the reference numerals used to the describe the user device 30, that is, 30, will be replaced by the prefix of the user device 24, that is, 24. In several exemplary embodiments, one of the user devices 24 and 30 is omitted in favor of the other of the user devices 24 and 30. In several exemplary embodiments, the user device 24 is combined in whole or in part with the user device 30.

In several exemplary embodiments, the platforms of the server 18 and the user devices 24 and 30 are identical, different, or vary with respect to equipment, peripherals, hardware architecture and/or specifications, software architecture and/or specifications, and/or any combination thereof.

Figure 3:
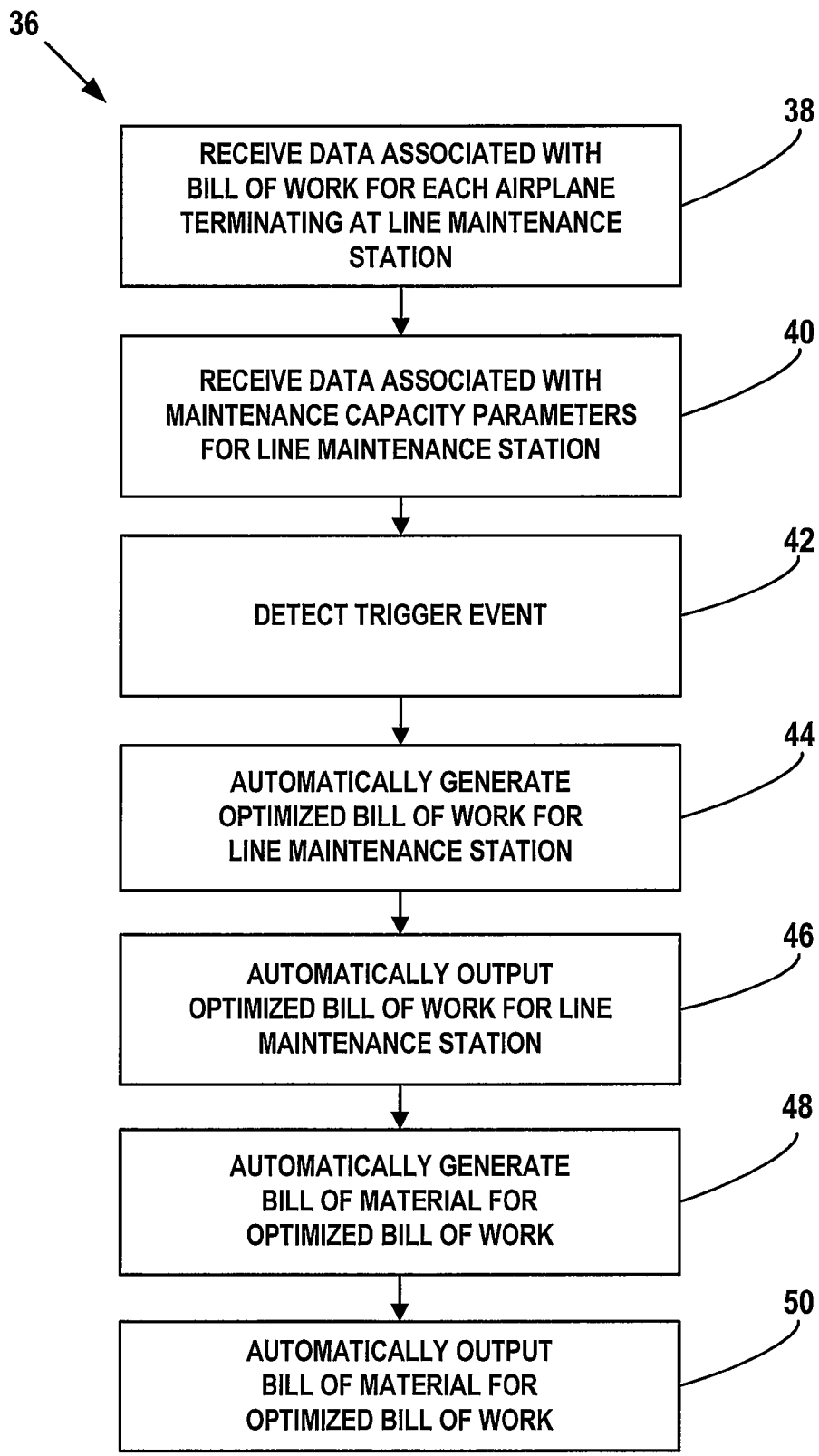
FIG. 3 is a flow chart illustration of a method of operating the system of FIG. 1, according to an exemplary embodiment.

In an exemplary embodiment, as illustrated in FIG. 3 with continuing reference to FIGS. 1A, 1B and 2, a method of operating the system 10 is generally referred to by the reference numeral 36 and, in several exemplary embodiments, the method 36 is implemented in whole or in part by the module 17, the user device 24, the user device 30, and/or any combination thereof. As shown in FIG. 3, the method 36 includes receiving data associated with the bills of work 18*a*, 18*b* and 18*c* in step 38, receiving data associated with the maintenance capacity parameters 16 in step 40, detecting a trigger event in step 42, automatically generating an optimized bill of work for the line maintenance station 12 in step 44, automatically outputting the optimized bill of work for the line maintenance station 12 in step 46, automatically generating a bill of material for the optimized bill of work for the line maintenance station 12 in step 48, and automatically outputting the bill of material for the optimized bill of work for the line maintenance station 12 in step 50.

In an exemplary embodiment, to receive data associated with the bills of work 18*a*, 18*b* and 18*c* in the step 38, a program such as, for example, a web browser, is executed by the processor 30*b* of the user device 30 at the maintenance operations center 28, and/or by the processor 24*b* of the user device 24 at the line maintenance station 12, thereby causing the web browser to access a website hosted by the server 18, which website provides access to one or more programs and data stored in one or more of the computer readable medium 20 and the database 22, with the accessed data stored in the one or more of the computer readable medium 20 and the database 22 having been received from one or more of the following data sources: one or more of the user devices 24 and 30; a dispatch environmental control system (DECS) (not shown) and/or one or more computer systems, host-based systems and/or applications thereof; an enhanced reservation system (RES) (not shown) and/or one or more computer systems, host-based systems and/or applications thereof; the Federal Aviation Administration (FAA) (not shown) and/or one or more computer systems, host-based systems and/or applications thereof; off-schedule operations (OSO) (not shown) and/or one or more computer systems, host-based systems and/or applications thereof; the flight operating system (FOS) 32 and/or one or more computer systems, host-based systems and/or applications thereof; the applications 34 and/or one or more computer systems, host-based systems and/or applications thereof, and an aircraft communication addressing and reporting system (ACARS) (not shown) and/or one or more computer systems, host-based systems and/or applications thereof. In an exemplary embodiment, to receive data in the step 38, data is accessed from the module 17, but at least a portion of the accessed data is not stored in the module 17, with the server 18 instead accessing the at least a portion of the data from one or more of the data sources noted above.

In an exemplary embodiment, during the execution of the method 36, the data received in the step 38 is continually and automatically updated, continually and automatically updated at predetermined time intervals, and/or any combination thereof, thereby ensuring that the data received in the step 38 remains current and accurate. In an exemplary embodiment, the step 38 further includes refreshing the received data with recent updates of the data from the module 17 and/or the aforementioned one or more data sources, issuing one or more queries for updated data from the module 17 and/or the aforementioned one or more data sources, issuing one or more queries for updated data from the module 17 and/or the aforementioned one or more data sources at predetermined time intervals, issuing one or more queries for all of the data previously received in the step 38, issuing one or more queries for all of the data previously received in the step 38 at predetermined time intervals, and/or any combination thereof.

In an exemplary embodiment, to receive data associated with the maintenance capacity parameters 16 in the step 40, the data is accessed in a manner substantially similar to the above-described manner in which data is accessed is the step 38.

In an exemplary embodiment, to detect a trigger event in the step 42, an express or inferred event that triggers the execution of the steps 44, 46, 48 and 50 is detected. In an exemplary embodiment, the express event may be one or more user requests by one or more personnel at the maintenance operations center 28, and/or at the line maintenance station 12, for the automatic generation of an optimized bill of work for the line maintenance station 12. In an exemplary embodiment, the inferred event may be the expiration of a predetermined time period subsequent to the most recently generated optimized bill of work for the line maintenance station 12. In an exemplary embodiment, the inferred event is when a data item upon which a portion of a previous optimized bill of work for the line maintenance station 12 was based has been modified. In an exemplary embodiment, the trigger event detected in the step 42 is one or more of the following: a routing change for the airplane 14a, 14b or 14c to a different line maintenance station; a change in the departure and/or arrival times for the airplane 14a, 14b or 14c; a status change at the maintenance operations center 28 (assign, lock down, lock out, etc.); a change in one or more of the maintenance capacity parameters 16, a change in the manhours parameter 16a, a change in the parking parameter 16b, a parking decision change; a change in parts (e.g., spare or replacement parts) availability; and a change in the bill of work 18a, 18b or 18c.

Figure 4:
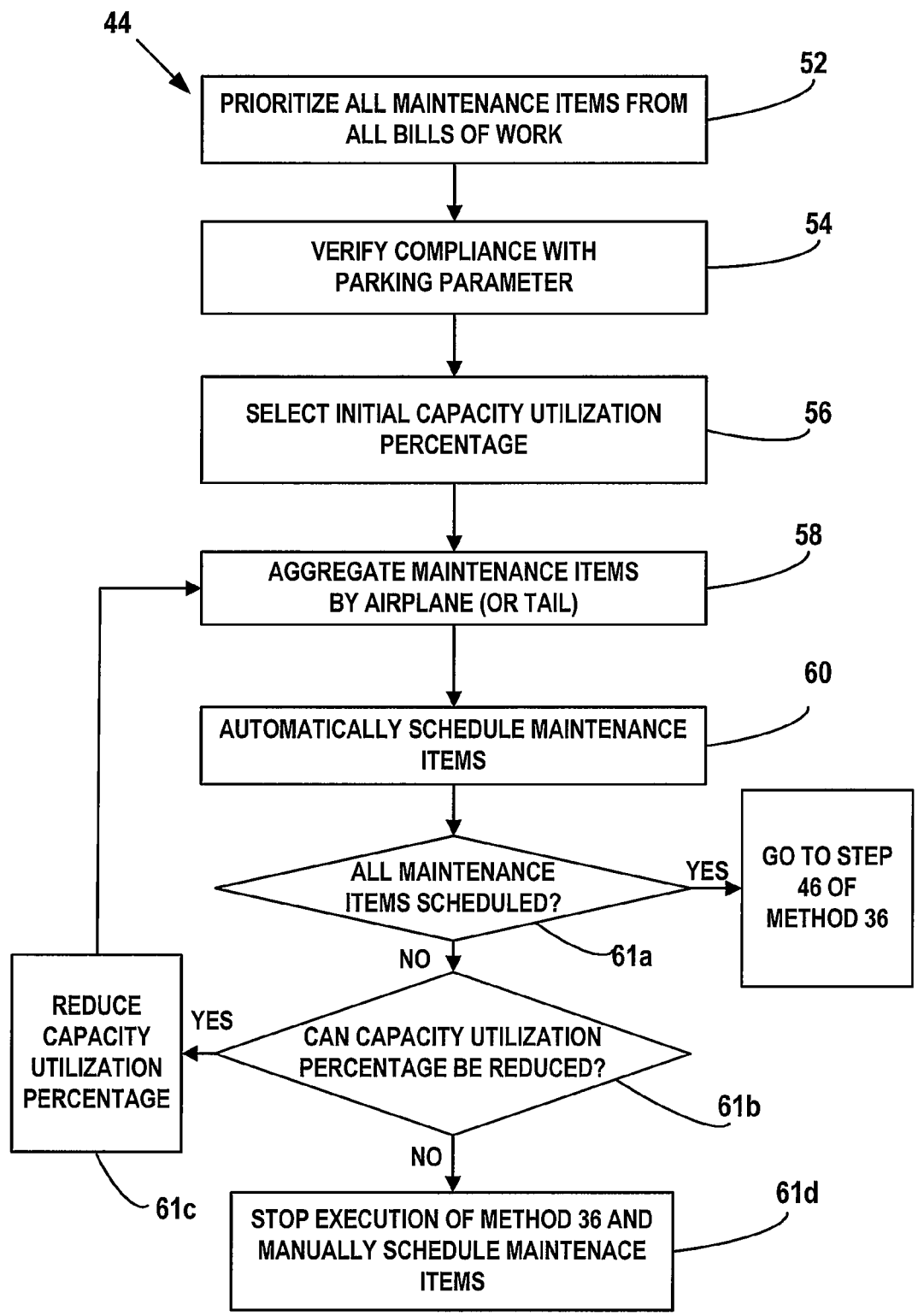
FIG. 4 is a flow chart illustration of a step of the method of FIG. 3, according to an exemplary embodiment.

In an exemplary embodiment, as illustrated in FIG. 4 with continuing reference to FIGS. 1A, 1B, 2 and 3, to automatically generate an optimized bill of work for the line maintenance station 12 in the step 44, all of the maintenance items T1'-T33 from the bills of work 18a, 18b and 18c are prioritized in step 52, the parking parameter 16b is verified in step 54, and an initial capacity utilization percentage is selected in step 56. In an exemplary embodiment, the capacity utilization percentage is used to determine or estimate the actual amount of hours of work that the AMTs at the line maintenance station 12 will indeed work during the time period t (or the work shift time period). This actual amount is always less than, and thus a percentage of, the manhours parameter 16a, that is, the amount of hours of work that the line maintenance station 12 has available to accomplish the work. In an exemplary embodiment, the capacity utilization percentage is used to ensure that there is extra time to work on unexpected and/or unscheduled maintenance items. The maintenance items are aggregated by airplane in step 58, and the maintenance items T11-T33 are scheduled in step 60. It is determined in step 61a whether all of the maintenance items have indeed been scheduled. If so, then the step 44 is completed and the step 46 (FIG. 3) is executed. If all of the maintenance items have not been scheduled, then it is determined in step 61b whether the capacity utilization percentage can be reduced, that is, whether the amount of work to be scheduled can be reduced to more easily schedule the work in the allotted time. If so, the capacity utilization percentage is reduced in step 61c and the steps 58, 60, 61a and 61b are repeated as applicable. In an exemplary embodiment, the percentage is reduced by 5%, 10% or 15% in the step 61c. If it is determined in the step 61b that the capacity utilization percentage cannot be reduced, then the execution of the method 36 is stopped and the maintenance items are manually scheduled in step 61d. In an exemplary embodiment, to determine if the capacity utilization percentage can be reduced in the step 61b, it is determined whether all of the critical maintenance items can still be completed even if the amount of hours to be worked in the allotted time is reduced.

In an exemplary embodiment, as illustrated in FIG. 5 with continuing reference to FIGS. 1A, 1B, 2, 3 and 4, to prioritize all of the maintenance items T11-T33 in the step 52, the maintenance items T11-T33 are prioritized in accordance with the attribute identifying which category each maintenance item belongs to (critical or noncritical), with the critical maintenance items being prioritized higher than the noncritical maintenance items. Additionally, in several exemplary embodiments, the maintenance items T11-T33 are prioritized by calculating a priority weight for each maintenance item on one or more of the following: business rules, time to go (TTG), yield, due date, part availability, tasks associated with maintenance item, future maintenance opportunity, other prioritization schemes, assignment status from the maintenance operations center 28, hangar requirement, and bill-of-work consistency. In an exemplary embodiment, the priority ranking of each of the maintenance items T11-T33 is determined based on a linear combination of the various priority weights. As shown in FIG. 5, in an exemplary embodiment, the maintenance items T11-T33 are ranked by assigning a score to each maintenance item from 1 to 100, with 100 indicating the highest possible priority. In an exemplary embodiment, the maintenance items T11-T33 are prioritized in the step 52 by using the server 18, the processor 24b, and/or the processor 30b to execute instructions stored in the computer readable medium 20, 24a and/or 30a, which results in the automatic prioritization of the maintenance items T11-T33, in accordance with the foregoing, and/or an automatic output of the prioritization of the maintenance items in, for example, a list, as shown in FIG. 5.

In an exemplary embodiment, before prioritizing the maintenance items T11-T33 in the step 52, the maintenance items T11-T33 may be filtered by identifying those maintenance items that cannot or should not be done because of, for example, one or more of the following reasons: station constraint (including base items), ground time violation, low-yield routine maintenance items, unavailability of parts, and conflict with critical maintenance items.

In an exemplary embodiment, to verify compliance with the parking parameter 16b in the step 54, it is determined whether the line maintenance station 12 has enough space or area to accommodate the parking of the airplanes 14a, 14b and 14c at the line maintenance station 12. If not, then one or more of the airplanes 14a, 14b and 14c are directed to a different line maintenance station. The remainder the execution of the method 36 will be described with the assumption that compliance with the parking parameter 16b has been verified. In several exemplary embodiments, the step 54 includes determining the parking location of each airplane 14a, 14b and 14c. In several exemplary embodiments, the determination of the parking location of each airplane 14a, 14b and 14c is based one or more of the following factors: maintenance item hangar requirement, fleet type, workload, arrival time, departure time, and/or any combination thereof.

Figure 6:
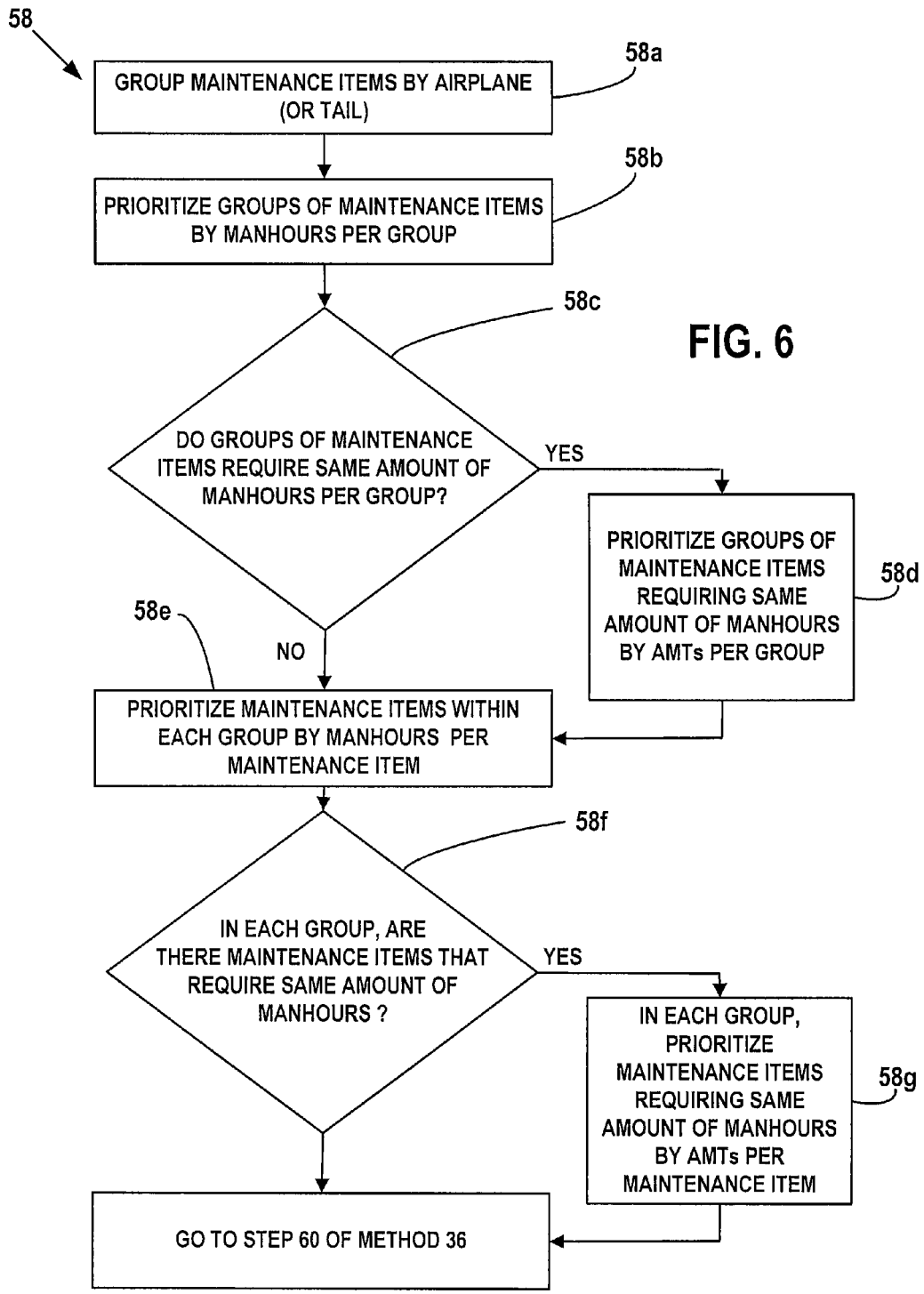
FIG. 6 is a flow chart illustration of a step of the step of FIG. 4, according to an exemplary embodiment.

In an exemplary embodiment, to select the initial capacity utilization percentage in the step 56, the capacity utilization of the manhours parameter 16a is estimated. As noted above, in an exemplary embodiment, the capacity utilization of the manhours parameter 16a is the actual amount of hours of work that the line maintenance station 12 will indeed work during the time period t. This actual amount is always less than, and thus a percentage of, the manhours parameter 16a, that is, the amount of hours of work that the line maintenance station 12 has available to accomplish the work. The estimated capacity utilization of the manhours parameter 16a must be equal to or greater than the total amount of manhours required to complete all critical maintenance items on the bills of work 18a, 18b and 18c. The initial capacity utilization percentage selected in the step 56 is subject to the following constraint:

(initial capacity utilization percentage)×(manhours parameter 16a)≥total number of manhours required to complete all critical maintenance items In an exemplary embodiment, as illustrated in FIGS. 6 and 7 with continuing reference to FIGS. 1A, 1B, 2, 3, 4 and 5, to aggregate the maintenance items T11-T33 by airplane (or tail number) in the step 58, the maintenance items T11-T33 are grouped by airplane (or tail) in step 58a, and the groups of maintenance items are prioritized by required manhours per group in step 58b, that is, groups of maintenance items requiring more manhours than other groups have a higher priority. In step 58c it is determined whether any groups of maintenance items require the same amount of manhours per group. If so, then such groups are prioritized by the number of AMTs required per group in step 58d. In step 58e, each maintenance item within each group of maintenance items is prioritized by the number of manhours required per each maintenance item. In step 58f it is determined whether any maintenance items in a particular group of maintenance items require the same amount of manhours per maintenance item. If so, then such maintenance items are prioritized by the number of AMTs required per maintenance item in step 58g. As a result of the step 58, the maintenance items T11-T33 are aggregated by generating a prioritized listing of groups of maintenance items, with each group including a prioritized listing of maintenance items with the group. For example, FIG. 7 shows an exemplary aggregation of the maintenance items T11-T33 by airplane (or tail) in accordance with the step 58. In an exemplary embodiment, the maintenance items T11-T33 are aggregated in the step 58 by using the server 18, the processor 24b, and/or the processor 30b to execute instructions stored in the computer readable medium 20, 24a and/or 30a, which results in the automatic aggregation of the maintenance items T11-T33, in accordance with the foregoing, and an automatic output of the aggregation of the maintenance items in, for example, a list, as shown in FIG. 7. In several exemplary embodiments, the aggregation of the maintenance items by airplane (or tail) in accordance with the step 58 reduces the occurrence of an AMT having to work on different airplanes (tail split) and improves efficiency.

Figure 8A:
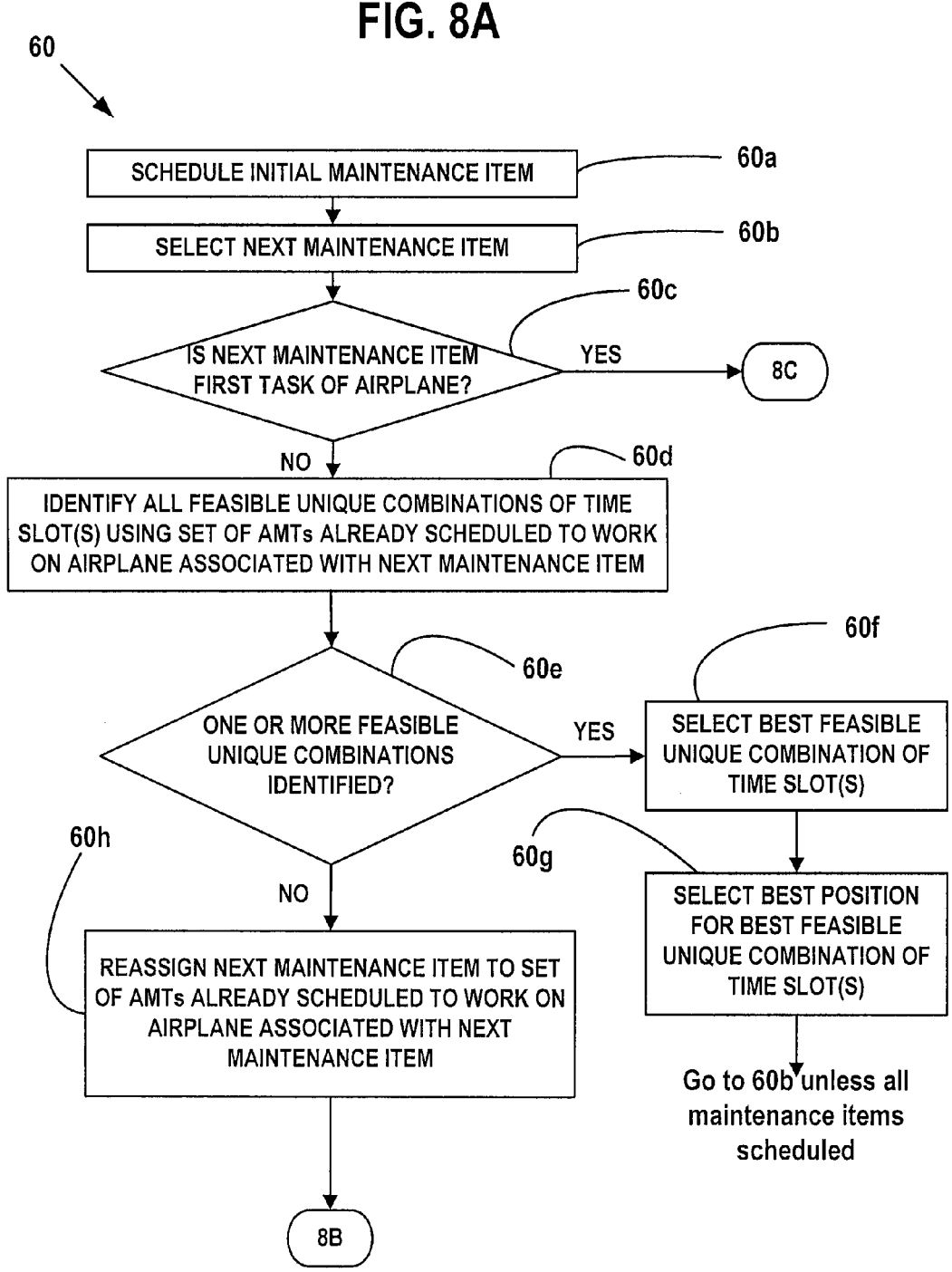
FIGS. 8A, 8B and 8C are flow chart illustrations of another step of the step of FIG. 4, according to an exemplary embodiment.

In an exemplary embodiment, as illustrated in FIGS. 8A-13 with continuing reference to FIGS. 1A, 1B, 2, 3, 4, 5, 6 and 7, to schedule all of the maintenance items T11-T33 in the step 60, the initial maintenance item is scheduled in step 60a, as shown in FIG. 8A.

As shown in FIG. 9, to schedule the initial maintenance item in the step 60a, the maintenance item with the highest priority is selected from the airplane (or tail) with the highest aggregated priority. For example, as shown in FIG. 7, the maintenance item T22 has the highest priority from the airplane that has the highest aggregated priority and thus the maintenance item T22 is selected in the step 60a. As shown in FIG. 9, in an exemplary embodiment, the maintenance item scheduled in the step 60a is graphically represented as a maintenance task profile 62. The number of hours of work required for each AMT for the maintenance item T22 (2 hours) is represented by a horizontal dimension 62a of the profile 62, as viewed in FIG. 9. The number of AMTs required for the maintenance item T22 (2 AMTs) is represented by a vertical dimension 62b of the profile 62, as viewed in FIG. 9. As also shown in FIG. 9, in an exemplary embodiment, the manhours parameter 16a is graphically represented as a plurality of time slots 64, each of which represents a work shift time period of an AMT. In an exemplary embodiment, as shown in FIG. 9, the selected maintenance item T22 is assigned to be the first-in-time task of the two topmost slots 64, which correspond to AMTs 1 and 2. That is, the first task to be completed by AMTs 1 and 2 during their work shift time period will be the maintenance item T22.

Referring back to FIGS. 8A, 8B and 8C, the next maintenance item is selected in step 60b, and in step 60c it is determined whether the next maintenance item selected in the step 60b is the first task on the corresponding airplane 14a, 14b or 14c. If the next maintenance items selected in the step 60b is not the first task on the corresponding airplane 14a, 14b or 14c, then all feasible unique combinations of the time slot(s) 64 for the next maintenance item selected in the step 60b are identified in step 60d. For example, as shown in FIG. 7, the next maintenance item after T22 is T21, which is not the first task on the corresponding airplane, namely the airplane 14b.

Figure 10:
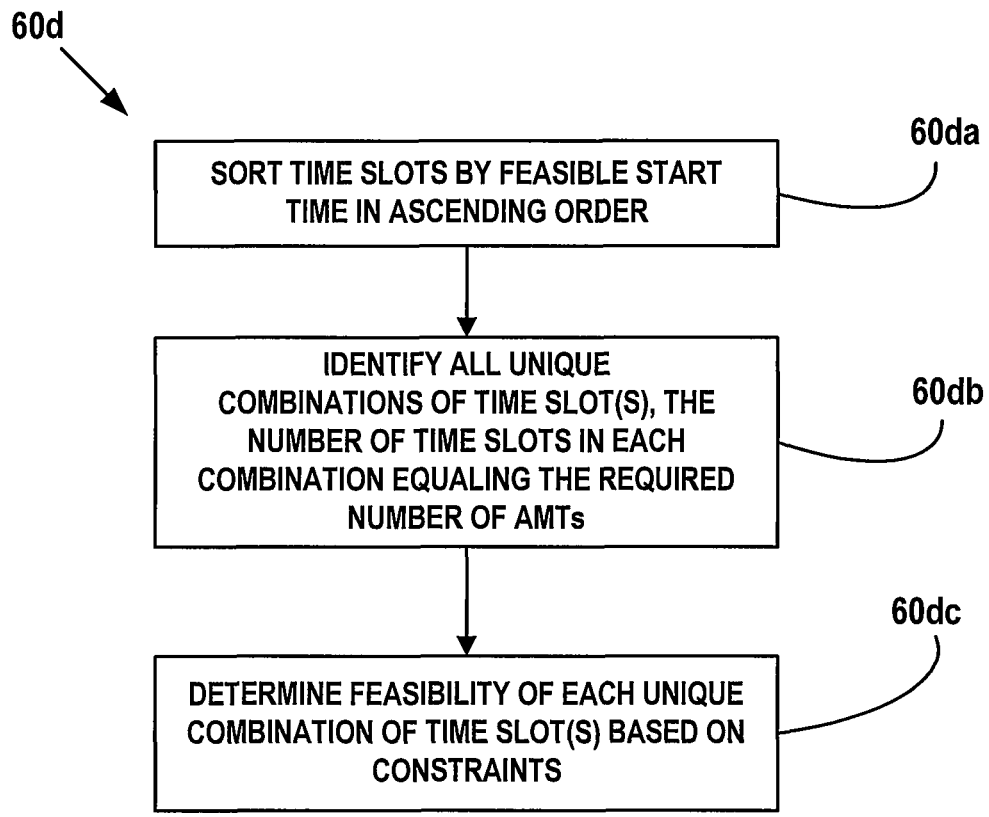
FIG. 10 is a flow chart illustration of a step of the step of FIGS. 8A, 8B and 8C, according to an exemplary embodiment.

As shown in FIG. 10, to identify all feasible unique combinations of the time slot(s) 64 in the step 60d, all of the slots 64 are sorted by a feasible start time in ascending order in step 60da, and then all of the unique combinations of the time slot(s) 64 are identified in step 60db, with the number of time slots in each combination equaling the required number of AMTs to complete the maintenance item. In the step 60db, only unique combinations of time slots are identified. That is, after AMT number n (i.e., the first AMT, second AMT, third AMT, etc.) has been specified in a particular combination, if there are AMTs working during time slots at the next subsequent feasible start time which are identical, that is, which have the same feasible start and end times, only one of the two or more AMTs working during the identical time slots will be specified as AMT number (n+1) (i.e., the second AMT, third AMT, etc.) in the step 60db. However, although only one of the two or more AMTs working during the identical time slots will be specified as AMT number (n+1) (i.e., the second AMT, third AMT, etc.), another of the two or more AMTs working during the identical times slots may be specified as AMT number (n+2) (i.e., the third AMT, etc.). All of the AMTs corresponding to the time slots that make up the unique combinations of time slots are AMTs that are already scheduled to work on one or more already-scheduled maintenance items associated with the airplane that the next maintenance item selected in the step 60*b* is associated with.

Figure 11:
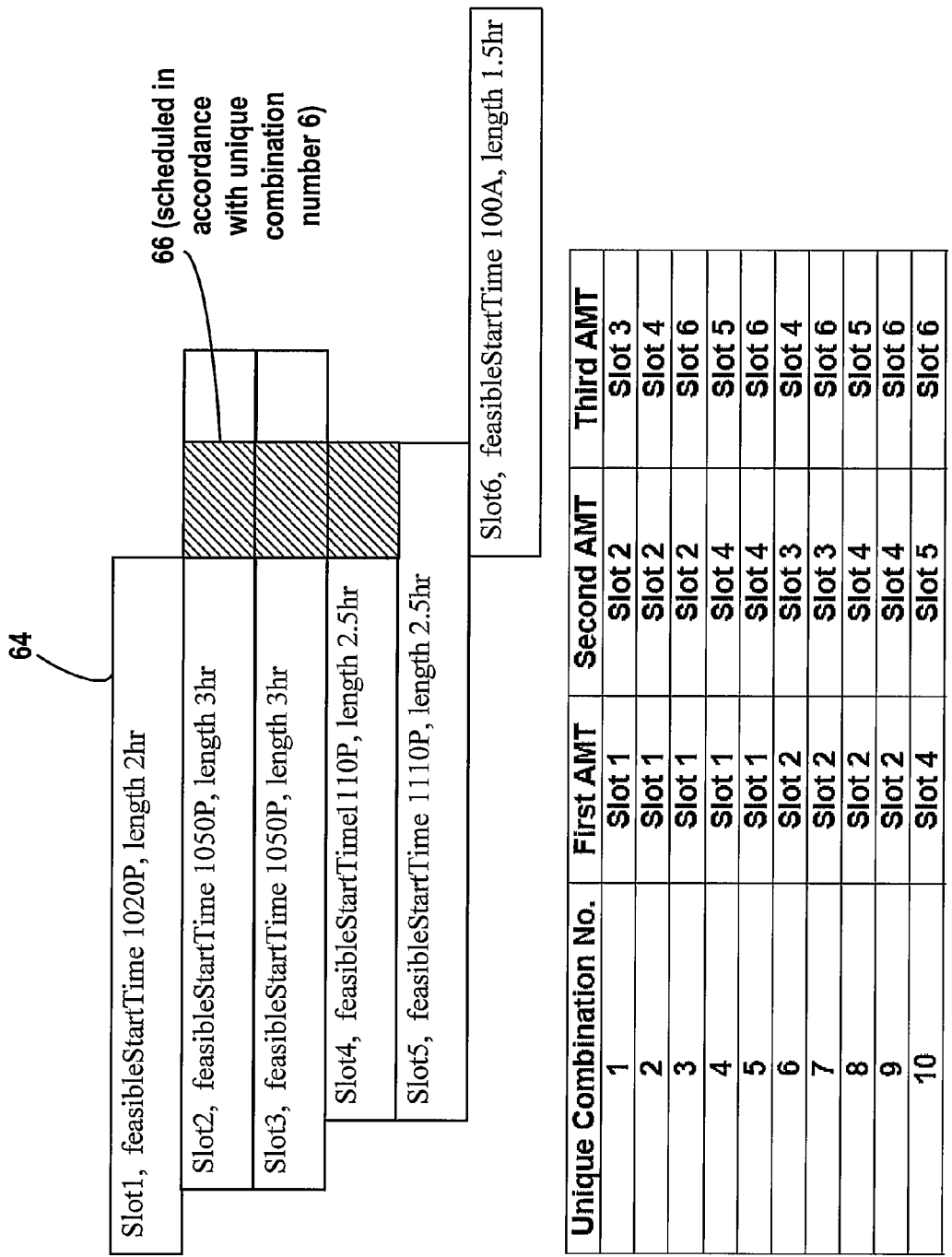
FIG. 11 are diagrammatic and tabular illustrations of the step of FIG. 10, according to an exemplary embodiment.

For example, as shown in FIG. 11, the next maintenance item is represented by a profile 66, which requires three AMTs, each of whom is required to work 30 minutes. Thus, ten unique combinations of time slots (combinations 1-10) are identified in the step 60*db*, as shown in FIG. 11. Unique combination number 1 specifies the AMT working during time slot 1, the AMT working during time slot 2, and the AMT working during time slot 3. Unique combination number 2 specifies the AMT working during time slot 1, the AMT working during time slot 2, and the AMT working during time slot 4. Unique combination number 3 specifies the AMT working during time slot 1, the AMT working during time slot 2, and the AMT working during time slot 6. However, a combination specifying the AMT working during time slot 1, the AMT working during time slot 2, and the AMT working during time slot 5, is not identified in the step 60*db* because the combination is not unique because the time slot 5 is identical to the time slot 4. Unique combination number 4 specifies the AMT working during time slot 1, the AMT working during time slot 4, and the AMT working during time slot 5. However, a combination specifying the AMT working during time slot 1, the AMT working during the time slot 3, and another AMT, is not identified in the step 60*db* because the combination is not unique because the time slot 3 is identical to the time slot 2. Unique combination number 5 specifies the AMT working during time slot 1, the AMT working during time slot 4, and the AMT working during time slot 6. Unique combination number 6 specifies the AMT working during time slot 2, the AMT working during time slot 3, and the AMT working during time slot 4. Unique combination number 7 specifies the AMT working during time slot 2, the AMT working during time slot 3, and the AMT working during time slot 6. However, a combination specifying the AMT working during time slot 2, the AMT working during time slot 3, and the AMT working during time slot 5, is not identified in the step 60*db* because the combination is not unique because the time slot 5 is identical to the time slot 4. Unique combination number 8 specifies the AMT working during the time slot 2, the AMT working during the time slot 4, and the AMT working during the time slot 5. Unique combination number 9 specifies the AMT working during the time slot 2, the AMT working during the time slot 4, and the AMT working during the time slot 6. Unique combination number 10 specifies the AMT working during the time slot 4, the AMT working during the time slot 5, and the AMT working during the time slot 6. As an example, FIG. 11 shows the possibility of scheduling the maintenance item represented by the profile 66 so that the three AMTs which correspond to the unique combination number 6 (i.e., time slot 2+time slot 3+time slot 4) are scheduled to work on the maintenance item.

With continuing reference to FIGS. 10 and 11, in an exemplary embodiment, after all of the unique combinations of times slots are identified in the step 60*db*, the feasibility of each unique combination of time slots is determined in step 60*dc*. In an exemplary embodiment, to determine feasibility in the step 60*dc*, it is determined whether each unique combination complies with or otherwise satisfies one or more operational constraints including but not limited to, for example, one or more of the following: compliance with profile, feasible start time, feasible end time, maximum shift time per AMT, various constraints specific to the line maintenance station 12, minimization of wasted time (i.e., time within the plurality of time slots 64 during which maintenance work is not scheduled), minimization of transition time incurred by AMTs transitioning between the airplanes 14*a*, 14*b* and 14*c* and/or between the line maintenance station 12 and one or more other locations, and maximization of open time (i.e., maximizing continuous blocks of remaining time in the time slots 64). For example, the unique combination number 5 shown in FIG. 11 is determined to not be feasible in the step 60*dc* because the feasible start time of the time slot 5 of FIG. 11 is past the feasible end time of the time slot 1 and/or the unique combination does not comply with the profile 66; thus, the profile 66 cannot "fit" or otherwise be scheduled in the unique combination number 5 shown in FIG. 11. In contrast, the unique combination number 6 shown in FIG. 11 is determined to be feasible in the step 60*dc*.

In an exemplary embodiment, the unique combinations of time slots are identified in the step 60*db* by using the server 18, the processor 24*b*, and/or the processor 30*b* to execute instructions stored in the computer readable medium 20, 24*a* and/or 30*a*, which results in the automatic identification of all unique combinations of time slots, in accordance with the foregoing, and/or an automatic output of the unique combinations in, for example, a list, as shown in FIG. 11. By identifying only unique combinations of times slots in the step 60*db*, the step 60 is executed more efficiently with a relatively shorter runtime when the step 60 is implemented by using one or more processors to execute one or more computer programs and/or other instructions stored on a computer readable medium. In several exemplary embodiments, efficiency and/or runtime improvements are most pronounced when the line maintenance station 12 has a relatively large manhours parameter 16*a* (i.e., a relatively large amount of manpower (headcount)).

Figure 12:
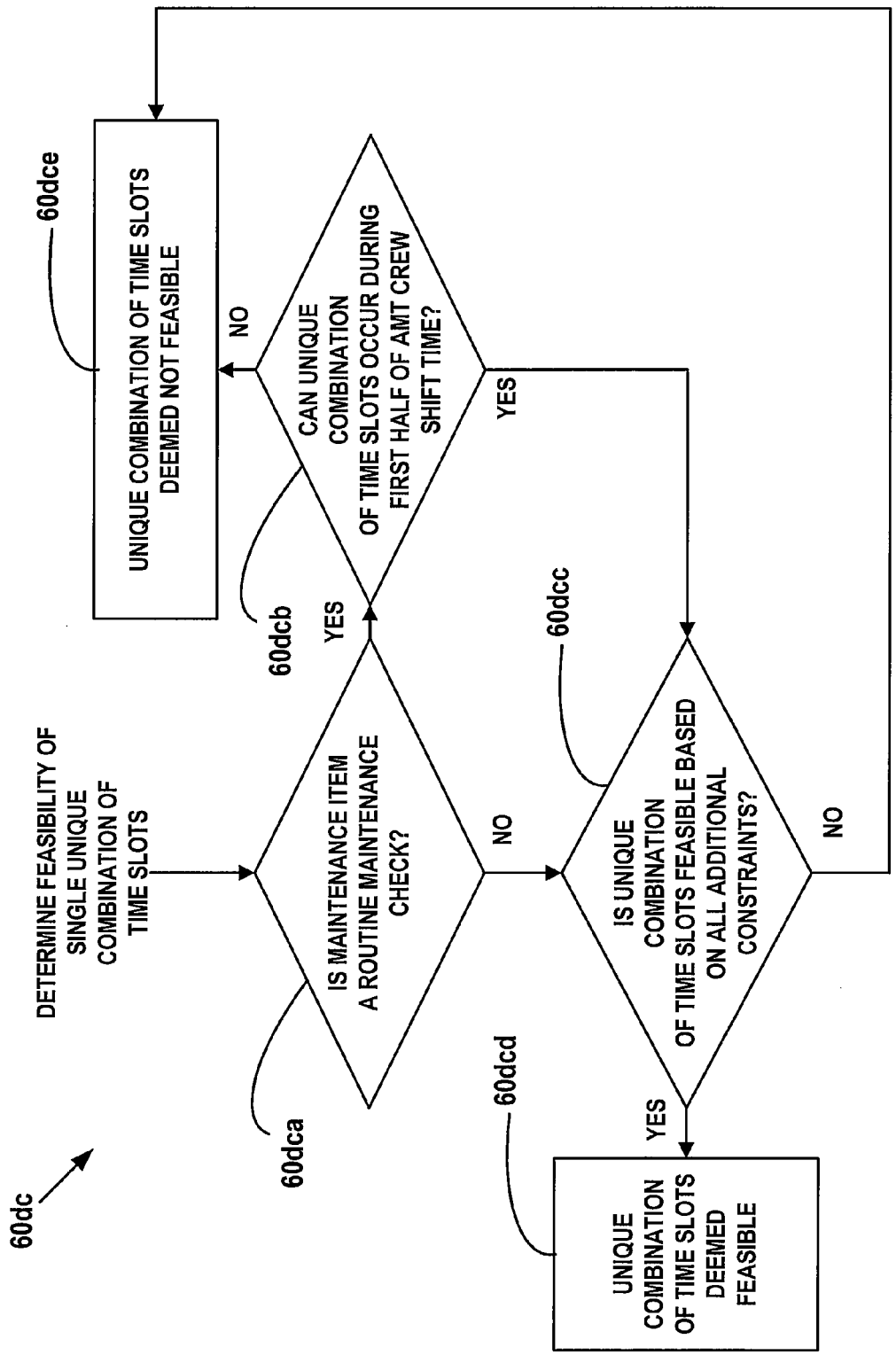
FIG. 12 is a flow chart illustration of at least a portion of a step of the step of FIG. 10, according to an exemplary embodiment.

As shown in FIG. 12, in an exemplary embodiment, to determine the feasibility of each unique combination of time slots in the step 60*dc*, the feasibility of a single unique combination of time slots is determined by determining in step 60*dca* whether the maintenance item to be worked on during the combination is a routine maintenance check. An example of such a routine maintenance check is a periodic service (PS) check, which an airplane undergoes every 2 or 3 days and during which the airplane is visually inspected and its maintenance log book is checked for entries and maintenance needs. Other examples of such routine maintenance checks include AC and SC checks, "A" checks, "B" checks and "C" checks. If it is determined in the step 60*dca* that the maintenance item is a routine maintenance check, then it is determined in step 60*dcb* whether the unique combination of time slots can comply with a constraint which requires that the unique combination of time slots will occur during the first half of the AMT crew work shift time period (e.g., during the left half of the time slots 64 shown in FIG. 9). This constraint provides a sufficient chance to fix any unexpected maintenance requirements that might be found during the routine checks. If it is determined in the step 60*dcb* that the unique combination of time slots complies with the constraint, then it is determined in step 60*dcc* whether the unique combination complies with any and all additional constraints. If so, then the unique combination is deemed feasible in step 60*dcd*. If not, then the unique combination is deemed not feasible in step 60*dce*. If it is determined in the step 60*dca* that the maintenance item is not a routine maintenance check, then the step 60*dcb* is omitted but the step 60*dcc* is executed, followed by either the step 60*dcd* or the step 60*dce*. In an exemplary embodiment, in the step 60*dc*, the steps 60*dca*, 60*dcb*, 60*dcc*, 60*dcd* and 60*dce* are repeated, as applicable, for each of the unique combinations of times slots identified in the step 60*db*.

Referring back to FIGS. 8A, 8B and 8C, it is determined in step 60*e* whether one or more feasible unique combinations were identified in the step 60*d*. If so, then the "best" or optimum feasible unique combination of time slots is selected in step 60*f*, and the "best" or optimum position within the manhours parameter 16*a* (i.e., the plurality of time slots 64) is selected in step 60*g*, and then the step 60*b* is repeated for the next maintenance item, followed by the steps subsequent to the step 60*b*, unless all maintenance items have been scheduled and the step 60 is completed. In an exemplary embodiment, the "best" or optimum feasible unique combination of time slots and the position thereof are selected in the steps 60*f* and 60*g* by minimizing wasted time, minimizing incremental transition time, and maximizing remaining open time. For example, if the unique combination number 6 of FIG. 11 is the "best" or optimum feasible unique combination selected in the step 60*f*, then the position in FIG. 11 may be the "best" or optimum position selected in the step 60*g*, or the position may be moved to the left, as viewed in FIG. 11, in order to, for example, minimize wasted time and/or maximize remaining open time, to thereby select the "best" or optimum position in the step 60*g*. All of the AMTs corresponding to the time slots that make up the "best" or optimum feasible unique combination selected in the step 60*f* are AMTs that are already scheduled to work on one or more already-scheduled maintenance items associated with the airplane that the next maintenance item selected in the step 60*b* is associated with.

As shown in FIG. 8A, if it is determined in the step 60*e* that one or more feasible unique combinations were not identified in the step 60*d*, then in step 60*h* the next maintenance item selected in the step 60*b* is reassigned to a set of AMTs already scheduled to work on the airplane associated with the next maintenance item.

Figure 13:
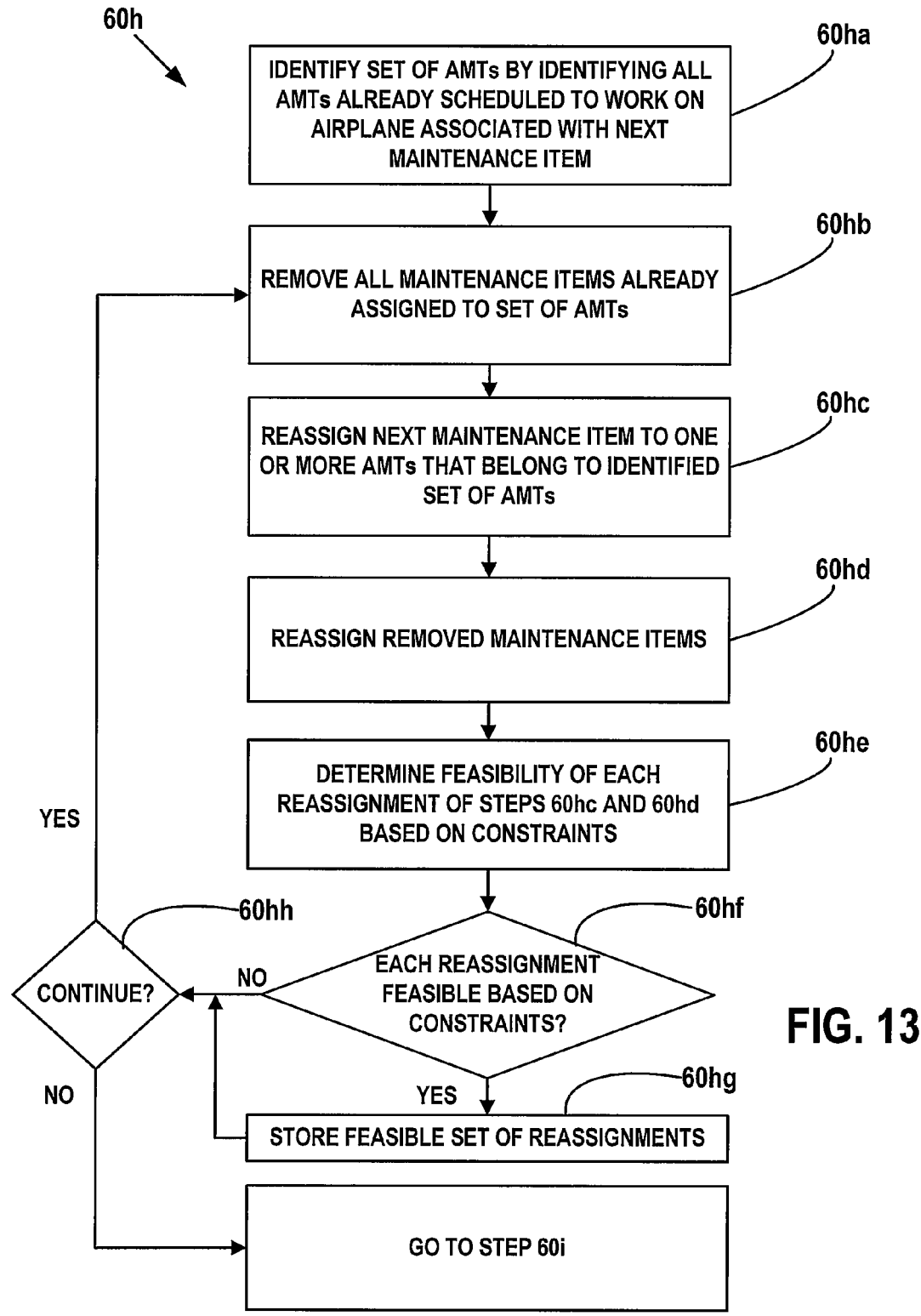
FIG. 13 is a flow chart illustration of yet another step of the step of FIGS. 8A, 8B and 8C, according to an exemplary embodiment.

As shown in FIG. 13, in an exemplary embodiment, to reassign the next maintenance item selected in the step 60*h* to the set of AMTs already scheduled to work on the airplane associated with the next maintenance item, the set of AMTs is identified in step 60*ha* by identifying all AMTs already scheduled to work on the airplane associated with the next maintenance item, that is, the airplane to be worked on in order to complete the next maintenance item. In step 60*hb*, all maintenance items already assigned to the set of AMTs identified in the step 60*ha* are removed from the plurality of time slots 64. In step 60*hc*, the next maintenance item is reassigned to one or more of the AMTs that belong to the set of AMTs identified in the step 60*ha*. In step 60*hd*, the maintenance items removed in the step 60*hb* are reassigned to the set of AMTs identified in the step 60*ha*. In step 60*he*, the feasibility of each reassignment completed in the steps 60*hc* and 60*hd* is determined. It is determined in step 60*hf* whether each of the reassignments is deemed feasible and, if so, the feasible set of reassignments is stored in step 60*hg*. The steps 60*hb*, 60*hc*, 60*hd*, 60*he*, 60*hf* and, if applicable, the step 60*hg*, are repeated until, for example, all, or a predetermined number of, combinations of reassignments have been completed and thus the step 60*h* is no longer to be continued, as determined in step 60*hh*.

In an exemplary embodiment, to determine feasibility in the step 60*he*, it is determined whether each reassignment complies with or otherwise satisfies one or more operational constraints including but not limited to, for example, one or more of the following: compliance with profile, feasible start time, feasible end time, maximum shift time per AMT, various constraints specific to the line maintenance station 12, minimization of wasted time (i.e., time periods within the plurality of time slots 64 during which maintenance work is not scheduled), minimization of transition time incurred by AMTs transitioning between the airplanes 14*a*, 14*b* and 14*c* and/or between the line maintenance station 12 and one or more other locations, and maximization of open time (i.e., maximizing continuous blocks of remaining time in the time slots 64). In an exemplary embodiment, the step 60*he* includes steps that are substantially identical to the steps 60*dca*, 60*dcb*, 60*dcc*, 60*dcd* and 60*dce*, which substantially identical steps are repeated for each reassignment of the maintenance items, rather than for each unique combination of time slots.

Referring back to FIG. 8B, it is determined in step 60*i* whether one or more feasible sets of reassignments were identified in the step 60*h*. If so, then the "best" or optimum feasible set of reassignments is selected in step 60*j*, and then the step 60*b* is repeated for the next maintenance item, followed by the steps subsequent to the step 60*b*, unless all maintenance items have been scheduled and the step 60 is completed. In an exemplary embodiment, the "best" or optimum feasible set of reassignments is selected in the step 60*j* by minimizing wasted time (time periods within the plurality of time slots 64 that are not filled with maintenance task profiles, that is, time periods during which maintenance items are not scheduled), minimizing incremental transition time, and maximizing remaining open time. All of the AMTs corresponding to the time slots that make up the "best" or optimum feasible set of reassignments selected in the step 60*j* are AMTs that are already scheduled to work on one or more already-scheduled maintenance items associated with the airplane that the next maintenance item selected in the step 60*b* is associated with.

Figure 8B:
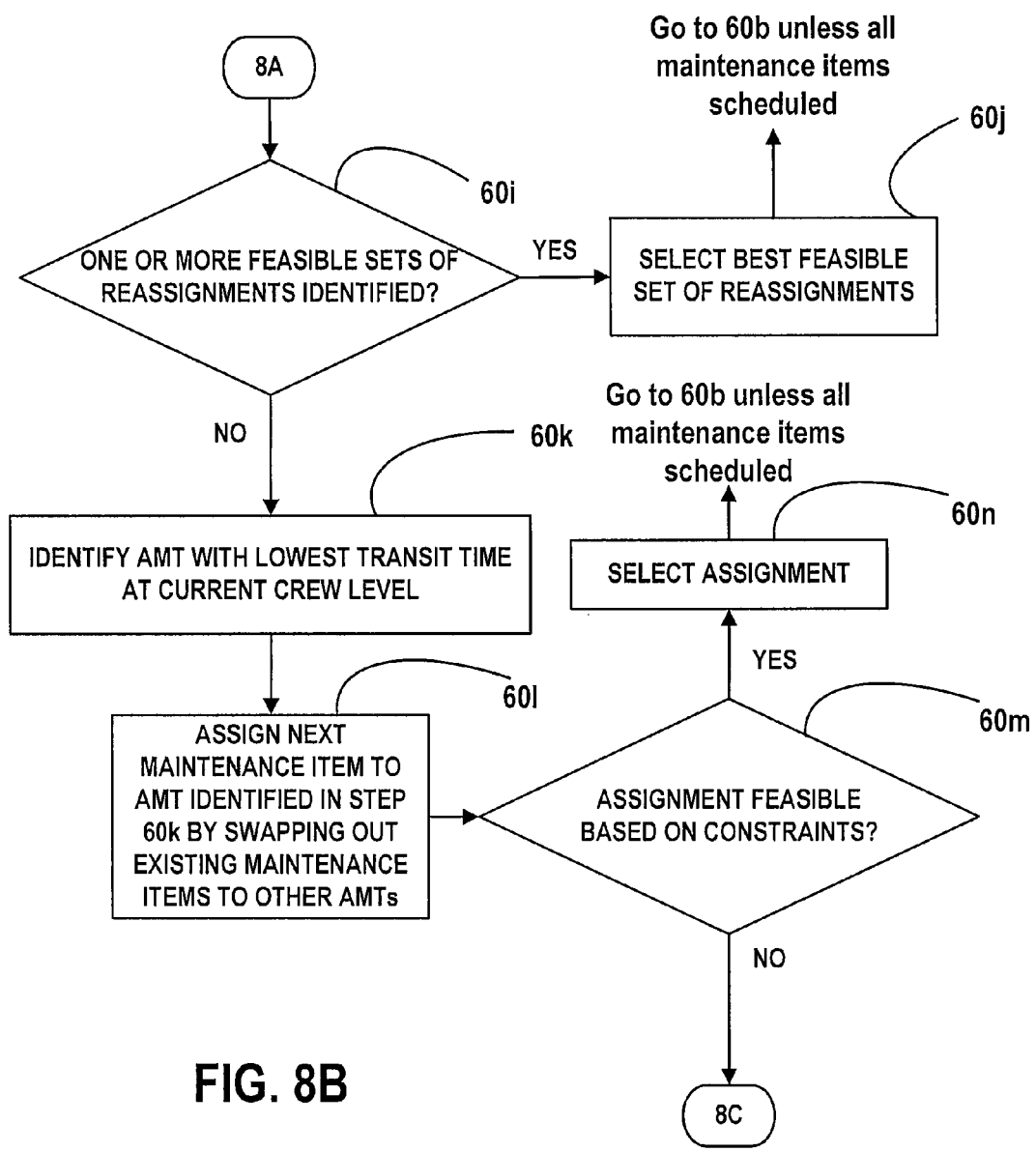

As shown in FIG. 8B, if it is determined in the step 60*i* that one or more feasible sets of reassignments were not identified in the step 60*h*, then in step 60*k* the AMT with lowest transition time at the current crew level is identified. The transition time refers to the amount of time it would take for an AMT that is scheduled to be at a remote location to move to the airplane associated with the next maintenance item selected in the step 60*b*. For example, the remote location may be another airplane that is different than the airplane associated with the next maintenance item, another area within the line maintenance station 12, or another area outside the line maintenance station 12. In the step 60*l*, the next maintenance item is assigned to the AMT identified in the step 60*k* by swapping out existing maintenance items assigned to the AMT to other AMTs. In the step 60*m* it is determined whether the assignment made in the step 60*l* is feasible based on one or more constraints. In an exemplary embodiment, to determine feasibility in the step 60*m*, it is determined whether the assignment complies with or otherwise satisfies one or more operational constraints including but not limited to, for example, one or more of the following: compliance with profile, feasible start time, feasible end time, maximum shift time per AMT, various constraints specific to the line maintenance station 12, minimization of wasted time (i.e., time within the plurality of time slots 64 during which maintenance work is not scheduled), minimization of transition time incurred by AMTs transitioning between the airplanes 14*a*, 14*b* and 14*c* and/or between the line maintenance station 12 and one or more other locations, and maximization of open time (i.e., maximizing continuous blocks of remaining time in the time slots 64). If the assignment is determined to be feasible in the step 60*m*, then the assignment is selected in step 60*n*, and then the step 60*b* is repeated for the next maintenance item, followed by the steps subsequent to the step 60*b*, unless all maintenance items have been scheduled and the step 60 is completed.

Figure 8C:
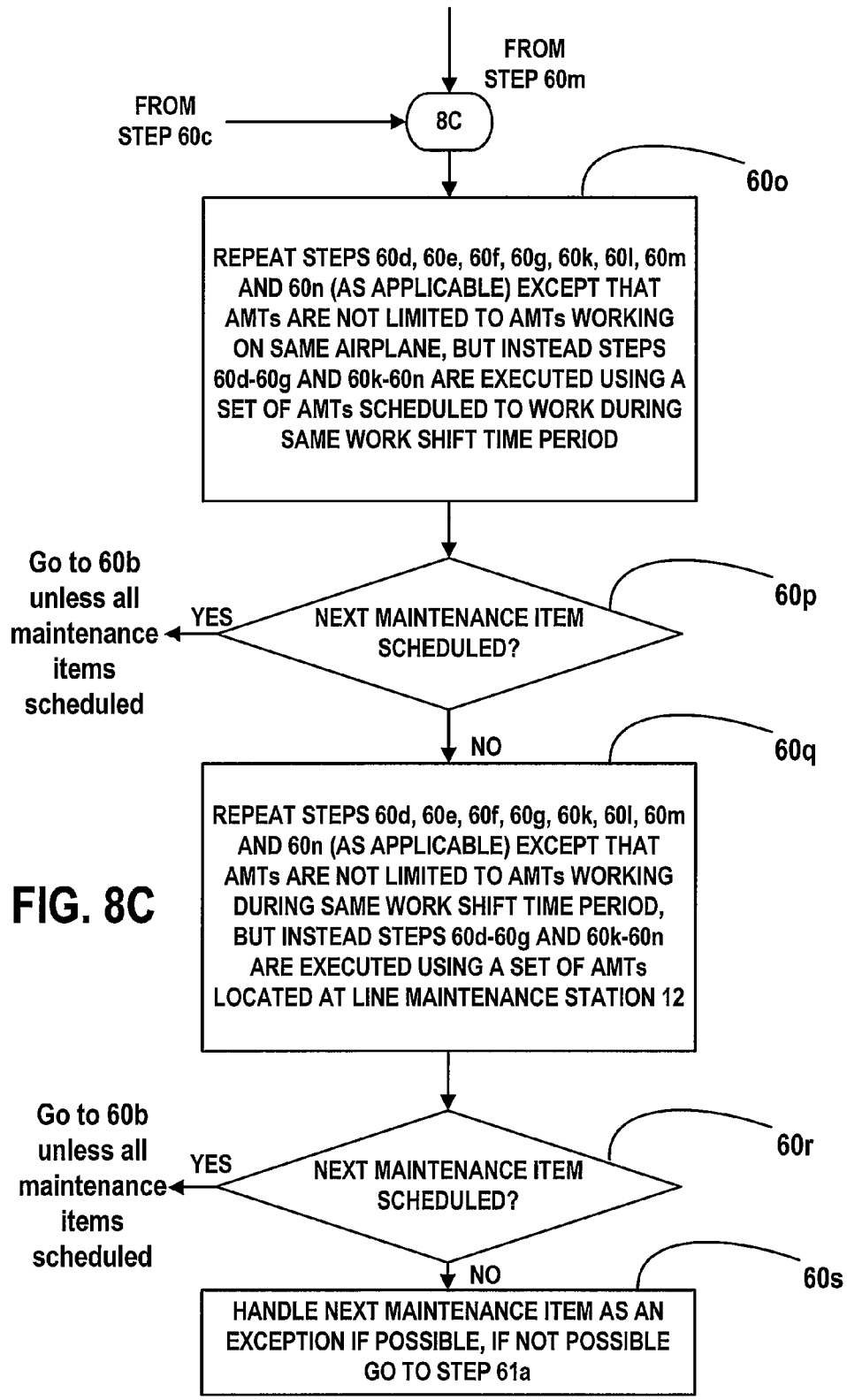

In an exemplary embodiment, as shown in FIGS. 8A, 8B and 8C, if it is determined in the step 60*m* that the assignment is not feasible based on operational constraints—or if it is determined in the step 60*c* that the next maintenance item is the first task of the airplane—then in step 60*o* the steps 60*d*, 60*e*, 60*f*, 60*g*, 60*k*, 60*l*, 60*m* and 60*n* are repeated as applicable, except that the steps are not repeated using a set of AMTs that is limited to the AMTs working on the same airplane; instead, the steps are repeated using a set of AMTs that includes all AMTs scheduled to work during the same work shift time period. In an exemplary embodiment, the set of AMTs that includes all AMTs scheduled to work during the same work shift time period includes the set of AMTs scheduled to work on the same airplane.

In step 60*p* it is determined whether the next maintenance item has been scheduled as a result of the execution of the step 60*o*. If so, then the step 60*b* is repeated for the next maintenance item, followed by the steps subsequent to the step 60*b*, unless all maintenance items have been scheduled and the step 60 is completed. If not, then in step 60*q* the steps 60*d*, 60*e*, 60*f*, 60*g*, 60*k*, 60*l*, 60*m* and 60*n* are repeated as applicable, except that the steps are not repeated using a set of AMTs that is limited to all AMTs scheduled to work during the same work shift time period; instead, the steps are repeated using a set of AMTs that includes all AMTs scheduled to be located at the line maintenance station 12. In an exemplary embodiment, the set of AMTs scheduled to be located at the line maintenance station 12 includes the set of AMTs scheduled to work during the same work shift time period.

In step 60*r* it is determined whether the next maintenance has been scheduled as a result of the execution of step 60*q*. If so, then the step 60*b* is repeated for the next maintenance item, followed by the steps subsequent to the step 60*b*, unless all maintenance items have been scheduled and the step 60 is completed. If not, then in step 60*s* the next maintenance item is handled as an exception, if possible, but if not possible then the step 60 is completed and the step 61*a* (FIG. 4) is executed. In an exemplary embodiment, to handle the next maintenance item as an exception in the step 60*s*, the task profile associated with the next maintenance item is changed and the next maintenance item is manually scheduled using the changed profile. In an exemplary embodiment, the task profile is changed by increasing or decreasing the number of AMTs deemed necessary to complete the next maintenance item, and/or decreasing or increasing the amount of time deemed necessary to complete the next maintenance item.

Figure 14:
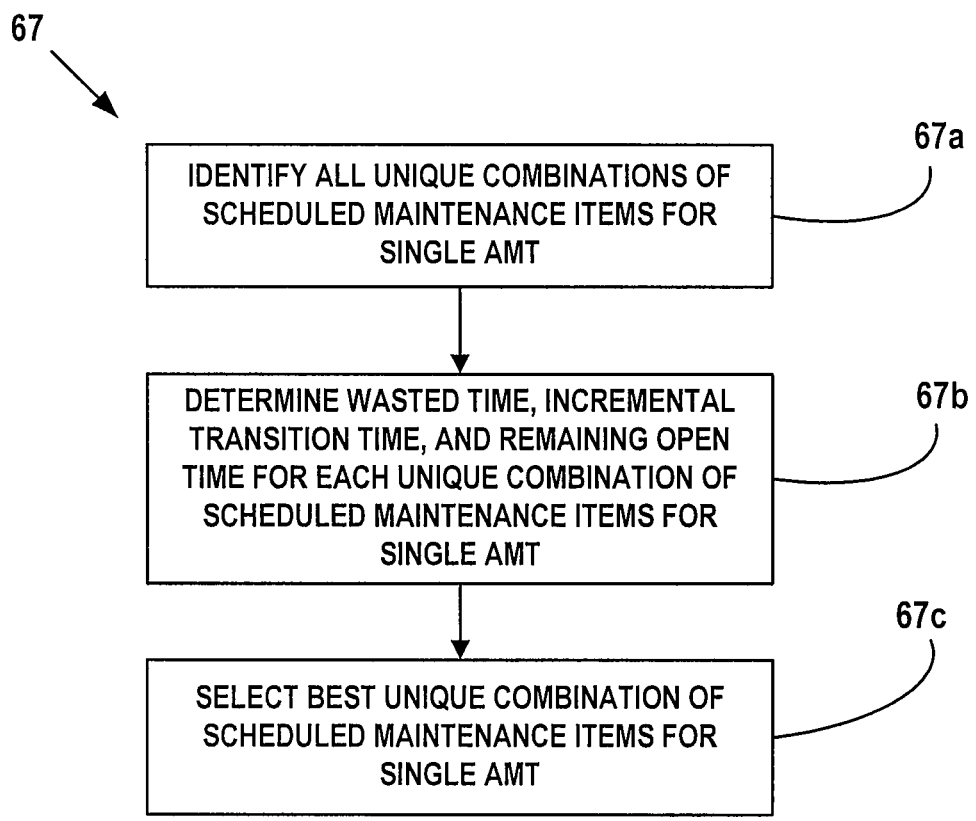
FIG. 14 is a flow chart illustration of a step executed during the step of FIGS. 8A, 8B and 8C, according to an exemplary embodiment.

In an exemplary embodiment, as illustrated in FIG. 14 with continuing reference to FIGS. 1A-13, during the step 60*d* and thus each of the steps 60*o* and 60*q*, a step 67 is executed, which is directed to re-sequencing the next maintenance item and all previously scheduled maintenance items on a single AMT. The step 67 includes identifying all unique combinations of scheduled maintenance items for a single AMT in step 67*a*. In step 67*b*, the wasted time, the incremental transition time, and the remaining open time are determined for each combination identified in the step 67*a*. In step 67*c*, the "best" or optimum of the unique combinations identified in the step 67*a* is selected by minimizing wasted time, minimizing incremental transition time, and maximizing remaining open time. In an exemplary embodiment, the step 67 is executed if it is determined in the step 60*dc* that a unique combination of time slots is not feasible. In an exemplary embodiment, the step 67 is executed if it is determined in the step 60*dc* that a unique combination of time slots is not feasible and, after the step 67 is executed, the step 60*dc* is repeated for that unique combination of time slots, which has been revised in accordance with the re-sequencing of all maintenance items for the single AMT in the step 67.

In an exemplary embodiment, as noted above and illustrated in FIG. 15 with continuing reference to FIGS. 1A-14, an optimized bill of work for the line maintenance station 12 is automatically outputted in the step 46. As shown in FIG. 15, an optimized bill of work 68 may be outputted to, for example, an electronic file and/or may be displayed on, or outputted using, the output device 24*c* and/or the output device 30*c*. The bill of work 68 reflects the optimized scheduling of the maintenance items in the step 44, and includes blocks 69 of time which represent the scheduling of the maintenance items between a set of AMTs over a period of time such as work shift time period, and which populate the plurality of time slots 64. In an exemplary embodiment, the optimized bill of work automatically outputted in the step 46 is a Gantt chart.

Figure 16A:
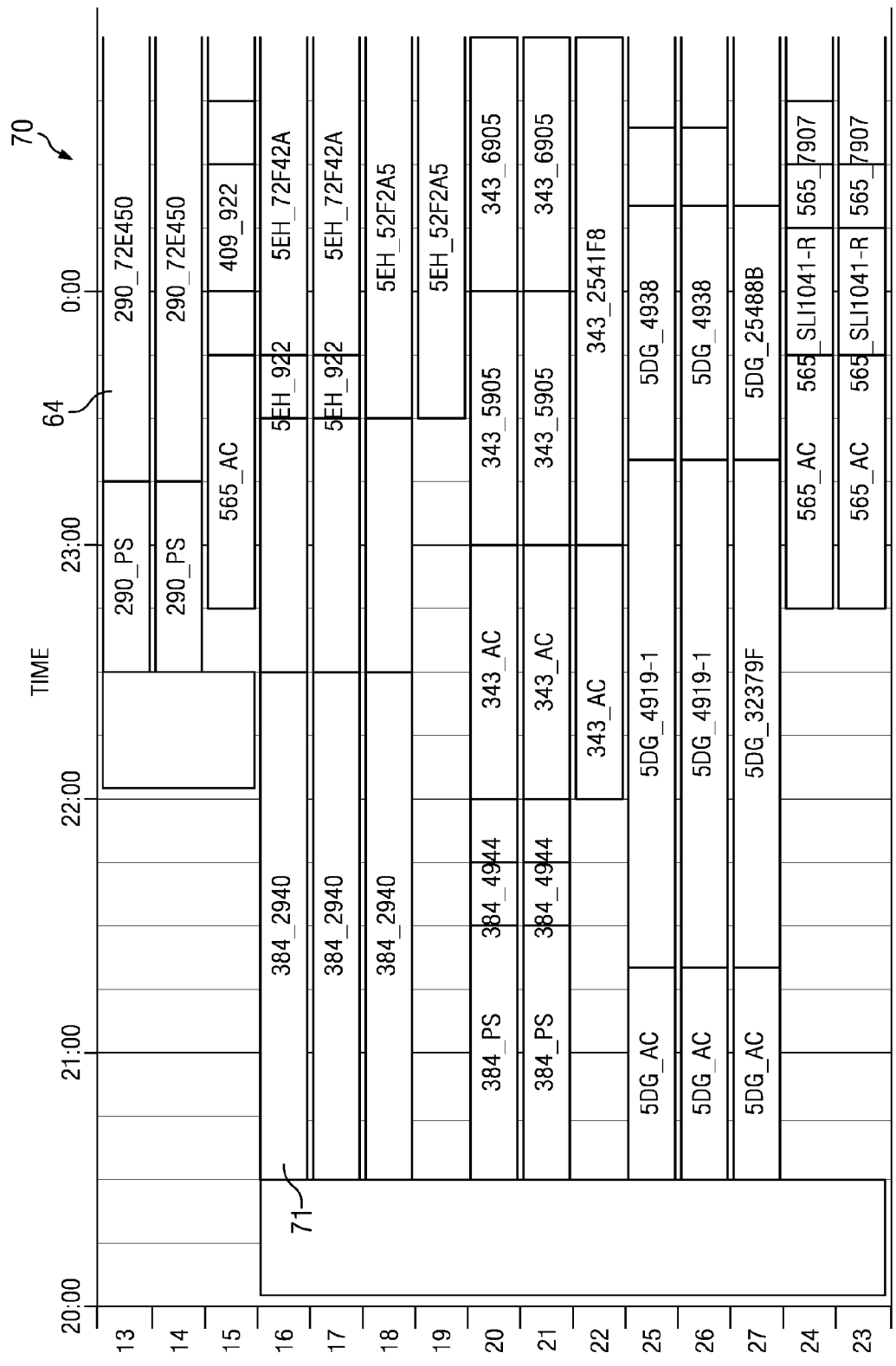
FIG. 16 is a diagrammatic illustration of a portion of output generated during the method of FIG. 3, according to an exemplary embodiment.
Figure 16B:
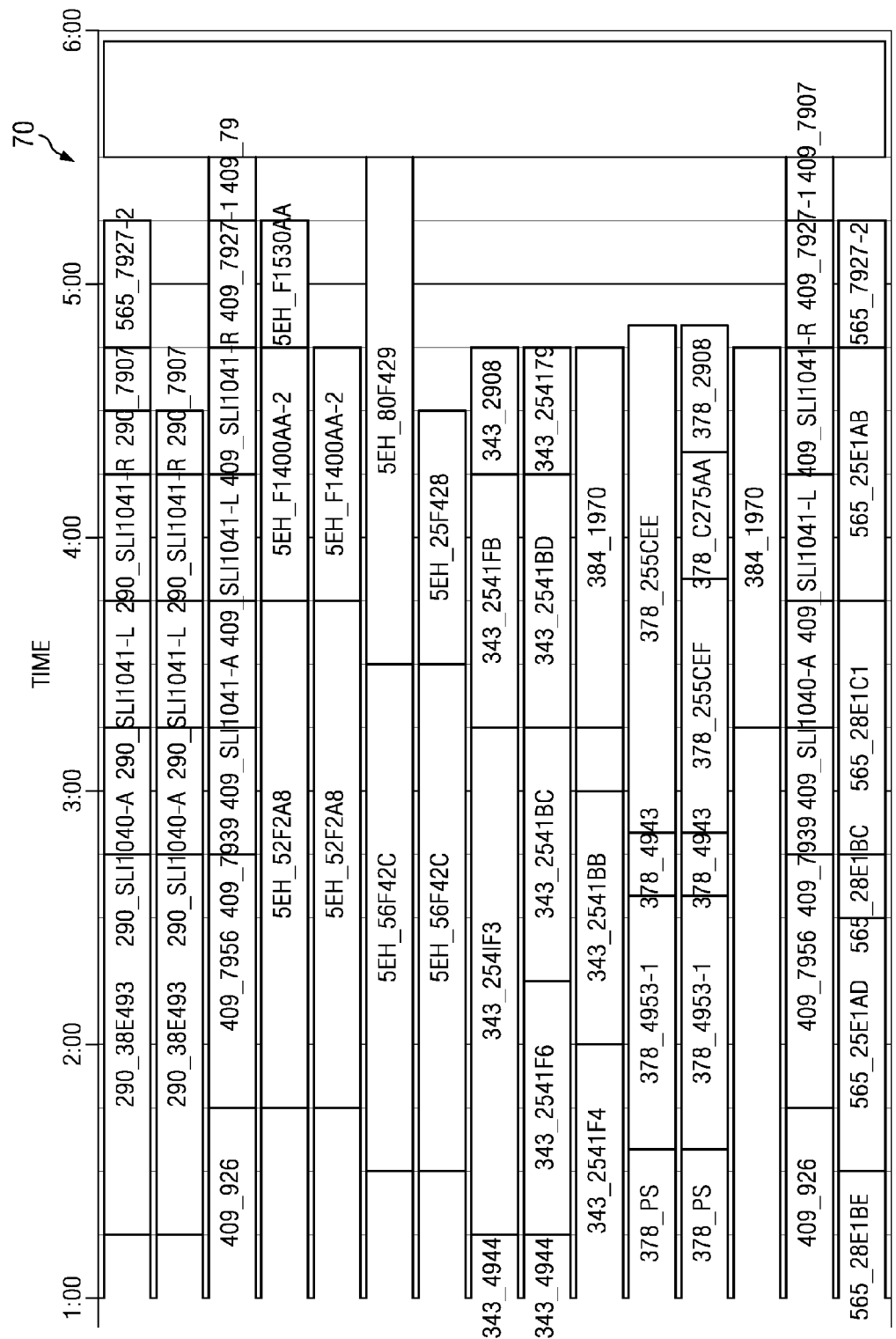
Figure 17:
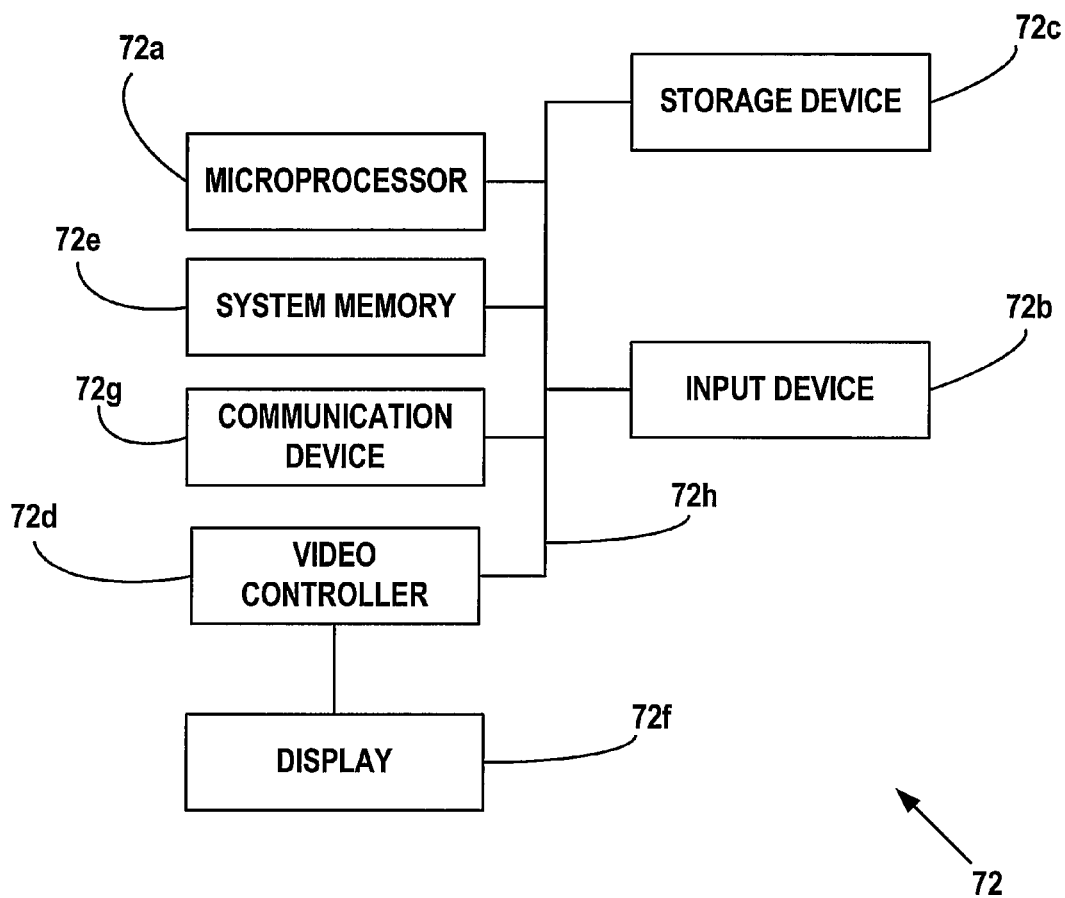
FIG. 17 is a diagrammatic illustration of a node for implementing one or more exemplary embodiments of the present disclosure, according to an exemplary embodiment.

In an exemplary embodiment, as illustrated in FIG. 16 with continuing reference to FIGS. 1A-15, to output an optimized bill for the line maintenance station 12 in the step 46, an optimized bill of work 70 may be outputted to, for example, an electronic file and/or may be displayed on, or outputted using, the output device 24*c* and/or the output device 30*c*. The bill of work 70 reflects the optimized scheduling of the maintenance items in the step 44, and includes blocks 71 of time which represent the scheduling of the maintenance items between a set of AMTs over a period of time such as work shift time period, and which populate the plurality of time slots 64.

In several exemplary embodiments, the module 17, the user device 24, the user device 30, and/or any combination thereof, are used to generate, store, and/or output the line maintenance station 12's optimized bill of work and/or the bill of material therefor.

In an exemplary embodiment, as illustrated in FIG. 21 with continuing reference to FIGS. 1-20, an illustrative node 72 for implementing one or more embodiments of one or more of the above-described networks, elements, methods and/or steps, and/or any combination thereof, is depicted. The node 72 includes a microprocessor 72*a*, an input device 72*b*, a storage device 72*c*, a video controller 72*d*, a system memory 72*e*, a display 72*f*, and a communication device 72*g* all interconnected by one or more buses 72*h*. In several exemplary embodiments, the storage device 72*c* may include a floppy drive, hard drive, CD-ROM, optical drive, any other form of storage device and/or any combination thereof. In several exemplary embodiments, the storage device 72*c* may include, and/or be capable of receiving, a floppy disk, CD-ROM, DVD-ROM, or any other form of computer-readable medium that may contain executable instructions. In several exemplary embodiments, the communication device 72*g* may include a modem, network card, or any other device to enable the node to communicate with other nodes. In several exemplary embodiments, any node represents a plurality of interconnected (whether by intranet or Internet) computer systems, including without limitation, personal computers, mainframes, PDAs, smartphones and cell phones.

In several exemplary embodiments, one or more of the user device 24, the user device 30 and the module 17 is, or at least includes, the node 72 and/or components thereof, and/or one or more nodes that are substantially similar to the node 72 and/or components thereof. In several exemplary embodiments, one or more of the above-described components of one or more of the node 72, the user device 24, the user device 30 and the module 17, include respective pluralities of same components.

In several exemplary embodiments, a computer system typically includes at least hardware capable of executing machine readable instructions, as well as the software for executing acts (typically machine-readable instructions) that produce a desired result. In several exemplary embodiments, a computer system may include hybrids of hardware and software, as well as computer sub-systems.

In several exemplary embodiments, hardware generally includes at least processor-capable platforms, such as client-machines (also known as personal computers or servers), and hand-held processing devices (such as smart phones, personal digital assistants (PDAs), or personal computing devices (PCDs), for example). In several exemplary embodiments, hardware may include any physical device that is capable of storing machine-readable instructions, such as memory or other data storage devices. In several exemplary embodiments, other forms of hardware include hardware sub-systems, including transfer devices such as modems, modem cards, ports, and port cards, for example.

In several exemplary embodiments, software includes any machine code stored in any memory medium, such as RAM or ROM, and machine code stored on other devices (such as floppy disks, flash memory, or a CD ROM, for example). In several exemplary embodiments, software may include source or object code. In several exemplary embodiments, software encompasses any set of instructions capable of being executed on a node such as, for example, on a client machine or server.

In several exemplary embodiments, combinations of software and hardware could also be used for providing enhanced functionality and performance for certain embodiments of the present disclosure. In an exemplary embodiment, software functions may be directly manufactured into a silicon chip. Accordingly, it should be understood that combinations of hardware and software are also included within the definition of a computer system and are thus envisioned by the present disclosure as possible equivalent structures and equivalent methods.

In several exemplary embodiments, computer readable mediums include, for example, passive data storage, such as a random access memory (RAM) as well as semi-permanent data storage such as a compact disk read only memory (CD-ROM). One or more exemplary embodiments of the present disclosure may be embodied in the RAM of a computer to transform a standard computer into a new specific computing machine. In several exemplary embodiments, data structures are defined organizations of data that may enable an embodiment of the present disclosure. In an exemplary embodiment, a data structure may provide an organization of data, or an organization of executable code.

In several exemplary embodiments, the network 26, and/or one or more portions thereof, may be designed to work on any specific architecture. In an exemplary embodiment, one or more portions of the network 26 may be executed on a single computer, local area networks, client-server networks, wide area networks, internets, hand-held and other portable and wireless devices and networks.

In several exemplary embodiments, a database may be any standard or proprietary database software, such as Oracle, Microsoft Access, SyBase, or DBase II, for example. In several exemplary embodiments, the database may have fields, records, data, and other database elements that may be associated through database specific software. In several exemplary embodiments, data may be mapped. In several exemplary embodiments, mapping is the process of associating one data entry with another data entry. In an exemplary embodiment, the data contained in the location of a character file can be mapped to a field in a second table. In several exemplary embodiments, the physical location of the database is not limiting, and the database may be distributed. In an exemplary embodiment, the database may exist remotely from the server, and run on a separate platform. In an exemplary embodiment, the database may be accessible across the Internet. In several exemplary embodiments, more than one database may be implemented.

In several exemplary embodiments, the system 10 and/or the execution of the method 36 provides a real time and event driven model, which assists workload planners in assigning the proper amount of maintenance to the line maintenance station 12, evens out workload, protects yield to a certain degree, quickly updates to reflect routing and other changes to further facilitate station workload planning, provides convenient reporting capability, provides more information to the field and MOC users, and identifies system performance and issues. In several exemplary embodiments, the system 10 and/or the execution of the method 36 automatically generate a feasible and balanced overnight bill of work for a line maintenance station, and provide an opportunity to respond to real time operational changes and improve station accountability.

In several experimental embodiments, experimental testing was conducted from April 2008 to June 2008 to determine the feasibility of the system 10 and/or the method 36, to gage user acceptance of the system 10 and/or the method 36, to obtain user feedback regarding the system 10 and/or the method 36, and to determine what changes needed to be made to the system 10 and/or the method 36. As a result of the experimental testing, inter alia, it was experimentally determined that the scheduling algorithm must be changed to assign bills-of-work more efficiently with shorter runtime, especially for relatively large maintenance stations with more manpower (headcount) capacity. As a result of this experimental determination, which, in turn, was a result of the experimental testing, only unique combinations of the time slot(s) 64 are identified in the step 60*db* in an exemplary embodiment, as described above. As a result of the experimental testing, inter alia, it was experimentally determined that it was necessary to assign routine maintenance checks to the first half of a work shift time period to provide a sufficient chance to fix any unexpected maintenance requirements that might be found during the routine maintenance checks. As a result of this experimental determination, which, in turn, was a result of the experimental testing, the step 60*dc* was added in an exemplary embodiment, as described above. As a result of the experimental testing, inter alia, it was experimentally determined that it was necessary to implement "alternative profile" approaches to reduce the chance of infeasible solutions in the event that the manpower was too tight to schedule critical maintenance items. As a result of this experimental determination, which, in turn, was a result of the experimental testing, exceptions to default maintenance task profiles were developed in the event that the default maintenance task profiles did not fit in any combination of remaining time slots, in accordance with several exemplary embodiments; and/or the step 60*s* was added in an exemplary embodiment, as described above. As a result of the experimental testing, inter alia, it was experimentally determined that the method must be changed to reflect field practice on how out of service (OTS) aircraft are scheduled. As a result of this experimental determination, which, in turn, was a result of the experimental testing, flexibility was added to permit assigning AMTs from one or more remote locations to work on OTS aircraft at a particular line maintenance station, and/or permit assigning overtime to an AMT (more hours to an AMT than the amount of hours in the AMT's work shift time period). As a result of the experimental testing, it was experimentally determined to identify the maintenance items that are associated with OTS aircraft, determine the number of AMTs that will work on the OTS aircraft, and then subtract the number of manhours that will work on the OTS aircraft from the manhours capacity parameter 16*a*.

A method has been described that includes receiving data associated with a bill of work for each vehicle in a plurality of vehicles each of which is parked at, or is expected to be parked at, a line maintenance station, each bill of work having one or more maintenance items, each maintenance item requiring an amount of manhours; detecting a trigger event; and automatically generating an optimized bill of work for the line maintenance station in response to detecting the trigger event, the optimized bill of work for the line maintenance station reflecting a scheduling of each maintenance item, the scheduling specifying at least the following for the maintenance item: a number of maintenance technicians that are expected to work on the maintenance item; and an amount of time each maintenance technician is expected to work on the maintenance item; wherein the sum of the amounts of time the maintenance technicians are expected to work on the maintenance item equals, or is greater than, the amount of manhours required by the maintenance item. In an exemplary embodiment, generating the optimized bill of work for the line maintenance station includes prioritizing the maintenance items; and aggregating the prioritized maintenance items by vehicle to thereby identify the order in which the maintenance items are to be scheduled. In an exemplary embodiment, aggregating the prioritized maintenance items by vehicle to thereby identify the order in which the maintenance items are to be scheduled includes grouping the maintenance items by vehicle; prioritizing the groups of maintenance items by the amount of manhours required to complete all of the maintenance items in each group; and if two or more groups require the same amount of manhours to complete all of the maintenance items in each group, then prioritizing the two or more groups by the amount of maintenance technicians required to complete all of the maintenance items in each group. In an exemplary embodiment, a time slot is associated with each maintenance technician and the amount of time the maintenance technician is expected to work on one maintenance item is a portion of the time slot; and wherein generating the optimized bill of work for the line maintenance station includes scheduling the initial maintenance item; and after scheduling the initial maintenance item, scheduling the next maintenance item, including determining whether the next maintenance item is the first task of the airplane associated with the next maintenance item; and if the next maintenance item is not the first task of the airplane associated with the next maintenance item, then identifying all feasible unique combinations of time slot(s) for the next maintenance item using a first set of one or more maintenance technicians, each maintenance technician in the first set being already scheduled to work on the airplane associated with the next maintenance item; and if the next maintenance item is the first task of the airplane associated with the next maintenance item, then identifying all feasible unique combinations of time slot(s) for the next maintenance item using a second set of maintenance technicians, the second set of maintenance technicians being larger in quantity than the first set of maintenance technicians. In an exemplary embodiment, identifying all feasible unique combinations of time slot(s) for the next maintenance item using either the first set or the second set of maintenance technicians includes sorting the time slot(s) associated with the maintenance technicians by feasible start time in ascending order; identifying all unique combinations of time slot(s), the number of time slot(s) in each unique combination being equal to the number of maintenance technicians required to complete the next maintenance item; and determining the feasibility of each unique combination of time slot(s). In an exemplary embodiment, each of the first and second sets of maintenance technicians has a work shift time period associated therewith; and wherein determining the feasibility of each unique combination of time slot(s) includes determining whether the next maintenance item is a routine maintenance check; if the next maintenance item is a routine maintenance check, then determining whether the unique combination of time slot(s) can occur during the first half of the corresponding work shift time period; and if the unique combination of time slot(s) cannot occur during the first half of the corresponding work shift time period, then deeming as not feasible the unique combination of time slot(s). In an exemplary embodiment, generating the optimized bill of work for the line maintenance station further includes determining if one or more feasible unique combinations of time slot(s) have been identified; and if one or more feasible unique combinations of time slot(s) have been identified, then selecting the optimum unique combination of time slot(s) by: minimizing wasted time within the time slots; minimizing transition time within the time slots; and maximizing open time within the time slots. In an exemplary embodiment, each maintenance item has an attribute associated with one of a plurality of categories of maintenance items, the plurality of categories including a category for critical maintenance items that must be completed during a work shift time period at the line maintenance and at least one category for non-critical maintenance items; and wherein the method further includes receiving data associated with a manhours capacity parameter of the line maintenance station, the manhours capacity parameter equaling the amount of manhours that are available to work on the vehicles during the work shift time period at the line maintenance station; and selecting an initial capacity utilization percentage, which is a percentage of the manhours capacity parameter; wherein the product of the initial capacity utilization percentage and the manhours capacity parameter is greater than, or equal to, the total number of manhours required to complete all critical maintenance items. In an exemplary embodiment, the method includes outputting the optimized bill of work for the line maintenance station; automatically generating a bill of material for the optimized bill of work for the line maintenance station; and automatically outputting the bill of material for the optimized bill of work for the line maintenance station. In an exemplary embodiment, the vehicles are airplanes and the maintenance technicians are aircraft maintenance technicians.

A computer readable medium has been described that includes a plurality of instructions stored therein, the plurality of instructions including instructions for receiving data associated with a bill of work for each vehicle in a plurality of vehicles each of which is parked at, or is expected to be parked at, a line maintenance station, each bill of work having one or more maintenance items, each maintenance item requiring an amount of manhours; instructions for detecting a trigger event; and instructions for automatically generating an optimized bill of work for the line maintenance station in response to detecting the trigger event, the optimized bill of work for the line maintenance station reflecting a scheduling of each maintenance item, the scheduling specifying at least the following for the maintenance item: a number of maintenance technicians that are expected to work on the maintenance item; and an amount of time each maintenance technician is expected to work on the maintenance item; wherein the sum of the amounts of time the maintenance technicians are expected to work on the maintenance item equals, or is greater than, the amount of manhours required by the maintenance item. In an exemplary embodiment, instructions for generating the optimized bill of work for the line maintenance station include instructions for prioritizing the maintenance items; and instructions for aggregating the prioritized maintenance items by vehicle to thereby identify the order in which the maintenance items are to be scheduled. In an exemplary embodiment, instructions for aggregating the prioritized maintenance items by vehicle to thereby identify the order in which the maintenance items are to be scheduled include instructions for grouping the maintenance items by vehicle; instructions for prioritizing the groups of maintenance items by the amount of manhours required to complete all of the maintenance items in each group; and instructions for if two or more groups require the same amount of manhours to complete all of the maintenance items in each group, then prioritizing the two or more groups by the amount of maintenance technicians required to complete all of the maintenance items in each group. In an exemplary embodiment, a time slot is associated with each maintenance technician and the amount of time the maintenance technician is expected to work on one maintenance item is a portion of the time slot; and wherein instructions for generating the optimized bill of work for the line maintenance station include instructions for scheduling the initial maintenance item; and instructions for after scheduling the initial maintenance item, scheduling the next maintenance item, including instructions for determining whether the next maintenance item is the first task of the airplane associated with the next maintenance item; and instructions for if the next maintenance item is not the first task of the airplane associated with the next maintenance item, then identifying all feasible unique combinations of time slot(s) for the next maintenance item using a first set of one or more maintenance technicians, each maintenance technician in the first set being already scheduled to work on the airplane associated with the next maintenance item; and instructions for if the next maintenance item is the first task of the airplane associated with the next maintenance item, then identifying all feasible unique combinations of time slot(s) for the next maintenance item using a second set of maintenance technicians, the second set of maintenance technicians being larger in quantity than the first set of maintenance technicians. In an exemplary embodiment, instructions for identifying all feasible unique combinations of time slot(s) for the next maintenance item using either the first set or the second set of maintenance technicians include instructions for sorting the time slot(s) associated with the maintenance technicians by feasible start time in ascending order; instructions for identifying all unique combinations of time slot(s), the number of time slot(s) in each unique combination being equal to the number of maintenance technicians required to complete the next maintenance item; and instructions for determining the feasibility of each unique combination of time slot(s). In an exemplary embodiment, each of the first and second sets of maintenance technicians has a work shift time period associated therewith; and wherein instructions for determining the feasibility of each unique combination of time slot(s) include instructions for determining whether the next maintenance item is a routine maintenance check; instructions for if the next maintenance item is a routine maintenance check, then determining whether the unique combination of time slot(s) can occur during the first half of the corresponding work shift time period; and instructions for if the unique combination of time slot(s) cannot occur during the first half of the corresponding work shift time period, then deeming as not feasible the unique combination of time slot(s). In an exemplary embodiment, instructions for generating the optimized bill of work for the line maintenance station further include instructions for determining if one or more feasible unique combinations of time slot(s) have been identified; and instructions for if one or more feasible unique combinations of time slot(s) have been identified, then selecting the optimum unique combination of time slot(s) by: minimizing wasted time within the time slots; minimizing transition time within the time slots; and maximizing open time within the time slots. In an exemplary embodiment, each maintenance item has an attribute associated with one of a plurality of categories of maintenance items, the plurality of categories including a category for critical maintenance items that must be completed during a work shift time period at the line maintenance and at least one category for non-critical maintenance items; and wherein the plurality of instructions further includes instructions for receiving data associated with a manhours capacity parameter of the line maintenance station, the manhours capacity parameter equaling the amount of manhours that are available to work on the vehicles during the work shift time period at the line maintenance station; and instructions for selecting an initial capacity utilization percentage, which is a percentage of the manhours capacity parameter; wherein the product of the initial capacity utilization percentage and the manhours capacity parameter is greater than, or equal to, the total number of manhours required to complete all critical maintenance items. In an exemplary embodiment, the plurality of instructions further includes instructions for outputting the optimized bill of work for the line maintenance station; instructions for automatically generating a bill of material for the optimized bill of work for the line maintenance station; and instructions for automatically outputting the bill of material for the optimized bill of work for the line maintenance station. In an exemplary embodiment, the vehicles are airplanes and the maintenance technicians are aircraft maintenance technicians.

It is understood that variations may be made in the foregoing without departing from the scope of the present disclosure. For example, instead of, or in addition to transportation transactions often conducted in the course of airline industry business, aspects of the present disclosure are applicable and/or readily adaptable to transportation transactions conducted in other industries, including rail, bus, cruise and other travel or shipping industries, rental car industries, hotels and other hospitality industries, entertainment industries, and other industries. In an exemplary embodiment, aspects of the present disclosure are readily applicable and/or readily adaptable to a shipping travel leg in which a ship travels from one port to one or more other ports. In an exemplary embodiment, aspects of the present disclosure are readily applicable and/or readily adaptable to a trucking travel leg during which a truck travels from one city to one or more other cities. In an exemplary embodiment, aspects of the present disclosure are readily applicable and/or readily adaptable to a rail travel leg during which a train travels from one city or station to one or more other cities or stations. In an exemplary embodiment, aspects of the present disclosure are applicable and/or readily adaptable to a wide variety of transportation transactions such as, for example, an airline sequence (i.e., a plurality of airline flights), a leg of an airline sequence (i.e., a single airline flight), an airline block, and/or any combination thereof.

In several exemplary embodiments, the elements and teachings of the various illustrative exemplary embodiments may be combined in whole or in part in some or all of the illustrative exemplary embodiments. In addition, one or more of the elements and teachings of the various illustrative exemplary embodiments may be omitted, at least in part, and/or combined, at least in part, with one or more of the other elements and teachings of the various illustrative embodiments.

Any spatial references such as, for example, "upper," "lower," "above," "below," "between," "bottom," "vertical," "horizontal," "angular," "upwards," "downwards," "side-to-side," "left-to-right," "right-to-left," "top-to-bottom," "bottom-to-top," "top," "bottom," "bottom-up," "top-down," etc., are for the purpose of illustration only and do not limit the specific orientation or location of the structure described above.

In several exemplary embodiments, while different steps, processes, and procedures are described as appearing as distinct acts, one or more of the steps, one or more of the processes, and/or one or more of the procedures may also be performed in different orders, simultaneously and/or sequentially. In several exemplary embodiments, the steps, processes and/or procedures may be merged into one or more steps, processes and/or procedures.

In several exemplary embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

Although several exemplary embodiments have been described in detail above, the embodiments described are exemplary only and are not limiting, and those skilled in the art will readily appreciate that many other modifications, changes and/or substitutions are possible in the exemplary embodiments without materially departing from the novel teachings and advantages of the present disclosure. Accordingly, all such modifications, changes and/or substitutions are intended to be included within the scope of this disclosure as defined in the following claims. In the claims, means-plus-function clauses are intended to cover the structures described herein as performing the recited function and not only structural equivalents, but also equivalent structures.

What is claimed is:

1. A computer implemented method for determining feasibility of scheduling a next maintenance item, from maintenance items to be performed on airplanes, under unique combinations of time slots and unique combinations of the maintenance items, the computer implemented method comprising:
   identifying the maintenance items to be performed on the airplanes, wherein the maintenance items comprise a first category of critical maintenance items and a second category of non-critical maintenance items;
   identifying a parking location for each of the airplanes based on at least a space requirement of a maintenance station,
   defining time slots as work shift periods corresponding to aircraft maintenance technicians working on the maintenance items;
   prioritizing, by a processor, each of the maintenance items in accordance to:
      the first category or the second category to which each of the maintenance items belongs,
      a linear combination of priority weights for each of the maintenance items according to two or more of: a hangar requirement, a due date, a future maintenance opportunity, a business rule, a part availability, a task, an assignment status, and a bill-of-work consistency; and based on said prioritizing:
   scheduling to the aircraft maintenance technicians and the time slots, an initial maintenance item, of the maintenance items, that has a highest priority from an airplane of the airplanes;
   selecting the next maintenance item, of the maintenance items, to be further assigned to the aircraft maintenance technicians, and, when the next maintenance item is not a first task of the airplane:
      sorting the time slots by a feasible start time in ascending order,
      identifying the unique combinations of the time slots, with the time slots in the unique combinations corresponding to a number of the aircraft maintenance technicians to complete the next maintenance item,
      determining the feasibility of scheduling the next maintenance item under the unique combinations of the time slots by minimizing a wasted time corresponding to the time slots during which maintenance work is not scheduled, minimizing a transition time incurred by each of the aircraft maintenance technicians transitioning between airplanes, and maximizing a remaining time in the time slots, and, when each of the unique combinations of the time slots is not feasible
      re-sequencing the next maintenance item by:
         identifying the unique combinations of scheduled maintenance items, from the maintenance items, for a single aircraft maintenance technician of the aircraft maintenance technicians;
         determining the wasted time, the transition time and the remaining time for each of the unique combinations of the scheduled maintenance items for the single aircraft maintenance technician;
         selecting, from the unique combinations of the scheduled maintenance items, an optimum unique combination of the scheduled maintenance items for the single aircraft maintenance technician by the minimizing the wasted time, the minimizing of the transition time, and maximizing the remaining time, and
         repeating the determining of the feasibility of scheduling the next maintenance item under the unique combinations of the time slots in accordance with the re-sequencing of the next maintenance item for the single aircraft maintenance technician.

2. The computer implemented method of claim 1, further comprising:
   filtering, from the maintenance items, a subset of items conflicting with the critical maintenance items or subject to: ground time violations or low-yield routine maintenance.

3. A non-transitory computer readable storage medium for determining feasibility of scheduling a next maintenance item, from maintenance items to be performed on airplanes, under unique combinations of time slots and unique combinations of the maintenance items, on said non-transitory computer readable storage medium being recorded computer executable instructions that, when executed by a processor, cause the processor to execute the steps of a method comprising:
   identifying the maintenance items to be performed on the airplanes, wherein the maintenance items comprise a first category of critical maintenance items and a second category of non-critical maintenance items;

identifying a parking location for each of the airplanes based on at least a space requirement of a maintenance station, defining time slots as work shift periods corresponding to aircraft maintenance technicians working on the maintenance items;

prioritizing, each of the maintenance items in accordance to:
   the first category or the second category to which each of the maintenance items belongs,
   a linear combination of priority weights for each of the maintenance items according to two or more of: a hangar requirement, a due date, a future maintenance opportunity, a business rule, a part availability, a task, an assignment status, and a bill-of-work consistency;
   and based on said prioritizing:

scheduling to the aircraft maintenance technicians and the time slots, an initial maintenance item, of the maintenance items, that has a highest priority from an airplane of the airplanes;

selecting the next maintenance item, of the maintenance items, to be further assigned to the aircraft maintenance technicians, and, when the next maintenance item is not a first task of the airplane:
   sorting the time slots by a feasible start time in ascending order,
   identifying the unique combinations of the time slots, with the time slots in the unique combinations corresponding to a number of the aircraft maintenance technicians to complete the next maintenance item,
   determining the feasibility of scheduling the next maintenance item under the unique combinations of the time slots by minimizing a wasted time corresponding to the time slots during which maintenance work is not scheduled, minimizing a transition time incurred by each of the aircraft maintenance technicians transitioning between airplanes, and maximizing a remaining time in the time slots, and, when each of the unique combinations of the time slots is not feasible
   re-sequencing the next maintenance item by:
      identifying the unique combinations of scheduled maintenance items, from the maintenance items, for a single aircraft maintenance technician of the aircraft maintenance technicians;
      determining the wasted time, the transition time and the remaining time for each of the unique combinations of the scheduled maintenance items for the single aircraft maintenance technician;
      selecting, from the unique combinations of the scheduled maintenance items, an optimum unique combination of the scheduled maintenance items for the single aircraft maintenance technician by the minimizing the wasted time, the minimizing of the transition time, and maximizing the remaining time, and
      repeating the determining of the feasibility of scheduling the next maintenance item under the unique combinations of the time slots in accordance with the re-sequencing of the next maintenance item for the single aircraft maintenance technician.

4. The non-transitory computer readable storage medium of claim 3, wherein the processor is further caused to execute:
   filtering, from the maintenance items, a subset of items conflicting with the critical maintenance items or subject to: ground time violations or low-yield routine maintenance.

* * * * *